(12) United States Patent
Tsurugaya et al.

(10) Patent No.: US 7,894,303 B2
(45) Date of Patent: Feb. 22, 2011

(54) DETECTION DEVICE, DETECTION PROGRAM AND DETECTION METHOD

(75) Inventors: Yoshiaki Tsurugaya, Tokyo (JP); Toshiaki Kikuchi, Kanagawa (JP)

(73) Assignee: NEC Corporation, Tokyo (JP)

( * ) Notice: Subject to any disclaimer, the term of this patent is extended or adjusted under 35 U.S.C. 154(b) by 510 days.

(21) Appl. No.: 12/055,819

(22) Filed: Mar. 26, 2008

(65) Prior Publication Data

US 2008/0239873 A1    Oct. 2, 2008

(30) Foreign Application Priority Data

Mar. 30, 2007    (JP) .............................. 2007-092104

(51) Int. Cl.
   *G01S 15/00* (2006.01)
(52) U.S. Cl. .................. 367/93; 367/103; 367/123; 367/138
(58) Field of Classification Search .................. 367/93, 367/87, 117, 131, 103, 123, 138
   See application file for complete search history.

(56) References Cited

U.S. PATENT DOCUMENTS

| 4,835,689 A |   | 5/1989 | O'Donnell |
| 4,953,954 A | * | 9/1990 | Ewbank et al. ............... 359/15 |
| 5,268,877 A | * | 12/1993 | Odell .......................... 367/103 |

FOREIGN PATENT DOCUMENTS

EP    1975645 A2 *  10/2008

OTHER PUBLICATIONS

R. Lim et al., "Scattering by objects buried in underwater sediments: Theory and experiment", (Apr. 1993), pp. 1762-1783, vol. 93, (4), Pt. 1, Journal of Acoustical Society of America.

F. A. Boyle et al., "A Model for high-frequency acoustic backscatter from gas bubbles in sandy sediments at shallow grazing angles", (Jul. 1995), pp. 531-541, vol. 98 (1), Journal of Acoustical Society of America.

S.A. Swift et al., "The scattering of a low-angle pulse beam from seafloor volume heterogeneities", (Aug. 1994), pp. 991-1001, vol. 96 (2), Pt. 1, Journal of Acoustical Society of America.

Darrell R. Jackson et al., "Phase conjugation in underwater acoustics", (Jan. 1991), pp. 171-181, vol. 89 (1), Journal of Acoustical Society of America.

(Continued)

*Primary Examiner*—Eric M Blount

(57) ABSTRACT

An object is detected without being constrained by the positional relationship between the object and the detecting position. A detection device includes a pseudo sound source and a monitoring unit. The pseudo sound source generates a scanning sound wave of a phase-conjugate wave in the time domain based on an acoustic signal by performing active phase conjugation, and causes the scanning sound wave to converge on the detection object from the above thereof within the propagation space by utilizing a feature that the scanning sound wave converges on the pseudo sound source which is the generation source of the acoustic signal. The monitoring unit extracts a reflected sound wave which is reflected at the detection object from the sound wave in the propagation space by performing passive phase conjugation. The detection object is detected based on presence or absence of the extracted reflected wave.

20 Claims, 23 Drawing Sheets

OTHER PUBLICATIONS

F.B. Jense et al., "Computational Ocean Acoustics", (1994), pp. 315-319, AIP Press, New York.

R.B. Evans, "A coupled mode solution for acoustic propagation in a waveguide with stepwise depth variations of a penetrable bottom", (Jul. 1983), pp. 188-195, vol. 74 (1), Journal of Acoustical Society of America.

Daniel Rouseff et al., "Underwater Acoustic Communication by Passive-Phase Conjugation: Theory and Experimental Results", (Oct. 2001), pp. 821-831, vol. 26, No. 4, IEEE Journal of Oceanic Engineering.

* cited by examiner

DETECTION DEVICE, DETECTION PROGRAM AND DETECTION METHOD

CROSS-REFERENCE TO RELATED APPLICATION

This application is based upon and claims the benefit of priority from Japanese patent application No. 2007-092104, filed on Mar. 30, 2007, the disclosure of which is incorporated herein in its entirety by reference.

BACKGROUND OF THE INVENTION

1. Field of the Invention

The present invention relates to a device, a program and a method to detect objects in the ocean for example, using a phase-conjugate pseudo sound sweeping system.

2. Related Art

Attempts to detect objects have been made in various technical fields. For instance, a sonar device is generally used for detecting objects (submarines, fishes, etc.) in the ocean.

Although a sonar device is also used for detecting objects (sunken ships, submarine cables, mines, etc.) buried in the sea bottom, a use is limited because the acoustic characteristics of the seawater and those of submarine sediments are different. That is, the seawater is liquid, but sediments on the sea bottom are in a solid state (but not a complete solid). An underwater sound wave (hereinafter, referred to as sound wave) has such a characteristic that when it is made incident on the boundary between the water and a submarine sediment, that is, made incident on the sea bottom, a part of the sound wave enters into the submarine sediment, although a part of the sound wave is reflected (reflected wave) at the sea bottom at the boundary. In this way, the sound wave is divided into three waves, including a transverse wave component (transverse wave) and a lateral wave component (lateral wave) besides a longitudinal wave component (longitudinal wave) which is the same as the water. If the incident angle of the sound wave is larger than the critical angle, the sound wave is totally reflected at the sea bottom without entering into the submarine sediment. A lateral wave is generated when the incident angle is larger than the critical angle.

As these three waves have different propagation speeds and propagating directions respectively, waves which strike an object buried in the submarine sediment (buried object) and reflect are also different, respectively. Therefore, in a wave receiver in the water, a reflected wave from the surface of the sea bottom and three wave components reflected at the sediment are complicatedly interfered and received. Thereby, detecting a buried object in the sea bottom involves difficulties (see "Scattering by objects buried in underwater sediments: Theory and experiment" by R. Lim, J. L. Lopes, R/H/ Hackman, and D. G. Todoroff, J. acoust. Soc. Am. 93, 1762-1783 (1993) (Non-Patent Document 1), "A Model for high-frequency acoustic backscatter from gas bubbles in sandy sediments at shallow grazing angles", by F. A. Boyle and N. P. Chotiros, J. Acoust. Soc. Am., 98, 531-541 (Non-Patent Document 2), and "The scattering of a low-angle pulse beam from seafloor volume heterogeneities" by S. A. Swift and R. A. Stephen, J. Acoust. Soc. Am. 96, 991-1001 (Non-Patent Document 3)).

The above-described difficulties involved in detection can be solved by performing detection on conditions that a transverse component and a lateral component are not generated. In other words, when a sound wave is made incident on the sea bottom at a vertical or almost vertical angle, neither a transverse component nor a lateral component are generated. Therefore, conventional methods of searching a buried object using sub bottom profiler for example usually scan the search area while emitting a sound wave immediately downward from a ship or a submarine.

However, in the above-described searching method, an enormous time is required for the search to scan the search area without limitation. Further, in the case that the buried object is explosive such as a mine, emitting a sound from right above will harm the survey vessel, so that the buried object cannot be detected.

SUMMARY OF THE INVENTION

It is an exemplary object of the invention to provide a detection device, a detection program and a detection method, capable of detecting an object without being constrained by the positional relationship between the object and the detecting position.

In order to achieve the object, a detection device using phase-conjugate pseudo sound source sweeping according to an exemplary aspect of the invention detects the object that exists in the propagation environment to which the transmitted sound wave diffuses. The detection device includes a pseudo sound source and a monitoring unit. The pseudo sound source generates a scanning sound wave of a phase-conjugate wave in the time domain based on an acoustic signal by performing active phase conjugation, and causes the scanning sound wave to converge on the detection object from the above thereof in the propagation space by utilizing a feature that the scanning sound wave converges on the position of the pseudo sound source which is the generation source of the acoustic signal. The monitoring unit extracts a reflected sound wave which is reflected at the detection object from the sound wave in the propagation environment by performing passive phase conjugation.

Although the present invention has been constructed as hardware, or a detection device, in the above description, the present invention is not limited to this configuration. The present invention may be a program for detection as software, or may be a detection method.

A program for detection according to another exemplary aspect of the invention is constructed to cause a computer, configuring a device for detecting the object that exists in the propagation environment to which the transmitted sound wave diffuses, to perform a function of generating a scanning sound wave of a phase-conjugate wave in the time domain based on an acoustic signal by performing active phase conjugation, and a function of extracting a reflected sound wave which is reflected at the detection object from the sound wave within the propagation space by performing passive phase conjugation.

A detection method using phase-conjugate pseudo sound source sweeping according to still another exemplary aspect of the invention is a method of detecting a detection object existing in the environment in which a sound wave for wave transmission scatters and propagates. The method includes, generating a scanning sound wave of a phase-conjugate wave in the time domain based on an acoustic signal by performing active phase conjugation, causing the scanning sound wave to converge on the detection object from the above thereof in the propagation space by utilizing a characteristic that the scanning sound wave converges on the position of the pseudo sound source which is the generation source of the acoustic signal, and extracting a reflected sound wave which is reflected at the detection object from the sound wave in the propagation space by performing passive phase conjugation.

As an exemplary advantage according to the invention, an object can be detected by performing phase-conjugate pseudo sound source sweeping, without being constrained by the positional relationship between the object and the detection position.

DESCRIPTION OF EXEMPLARY EMBODIMENT

Hereinafter, an exemplary embodiment of the invention will be described in detail based on the drawings.

Figure 1:
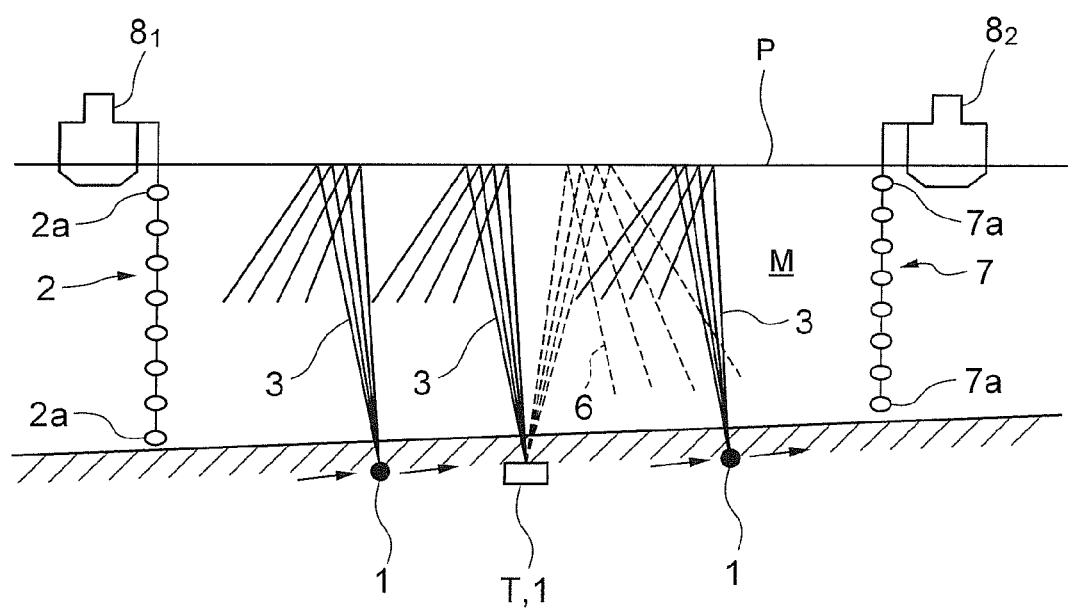
FIG. 1 illustrates a state of scanning the sea bottom with a phase conjugated wave from a pseudo sound source in an exemplary embodiment of the invention.

As shown in FIG. 1, an exemplary embodiment of the invention is characterized in that a sound wave is transmitted from a position away from immediately above a detection object T into the water M such that the sound wave is made incident on the detection object T from the above thereof so as to detect the detection object T. In other words, the exemplary embodiment is characterized as to transmit a scanning sound wave 3, which is generated by performing active phase processing on an acoustic signal 1a emitted from the pseudo sound source 1, to a propagation space (M), and by utilizing a characteristic that the scanning sound wave 3 converges on the pseudo sound source 1 which is the generation source of the acoustic signal 1a, cause the scanning sound wave 3 to converge on the detection object T in the propagation space (M), perform passive phase conjugation to the sound wave which is propagated through the propagation space (M) and received, and extract a reflected sound wave 6 reflected at the detection object T in the propagation space (M) to thereby detect the detection object based on presence or absence of the reflected sound wave 6. Further, the exemplary embodiment is characterized in that, by moving the position of the pseudo sound source 1 within the propagation space (M) in a pseudo manner, the propagation space is swept and scanned with the scanning sound wave 3. Although the following description is given on the case where the propagation space is in the ocean M, and the detection object T is an object buried in the sea bottom F, the present invention is not limited to this configuration.

Figure 2:
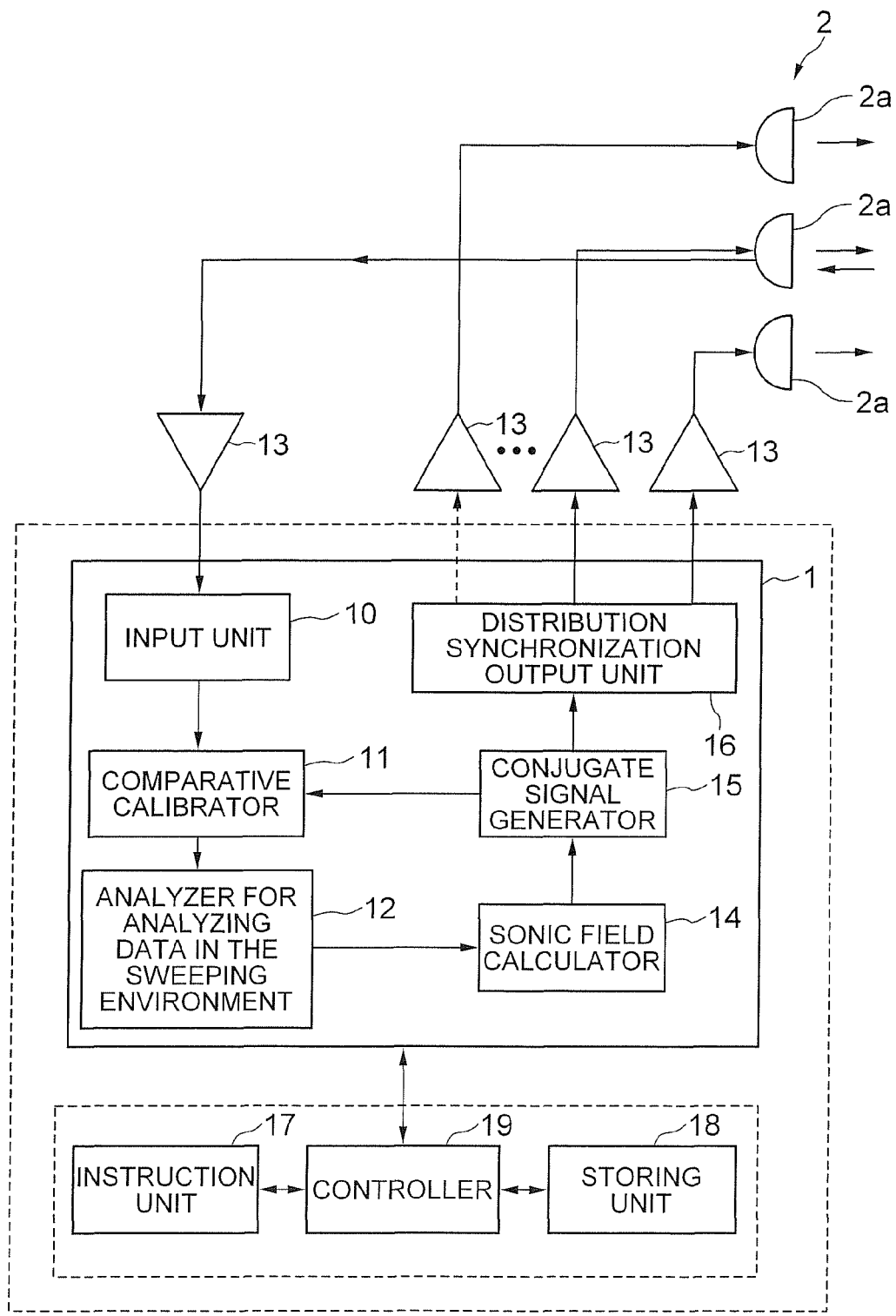
FIG. 2 is a block diagram showing a specific configuration of a pseudo sound source for performing active phase conjugation in the exemplary embodiment of the invention.
Figure 3:
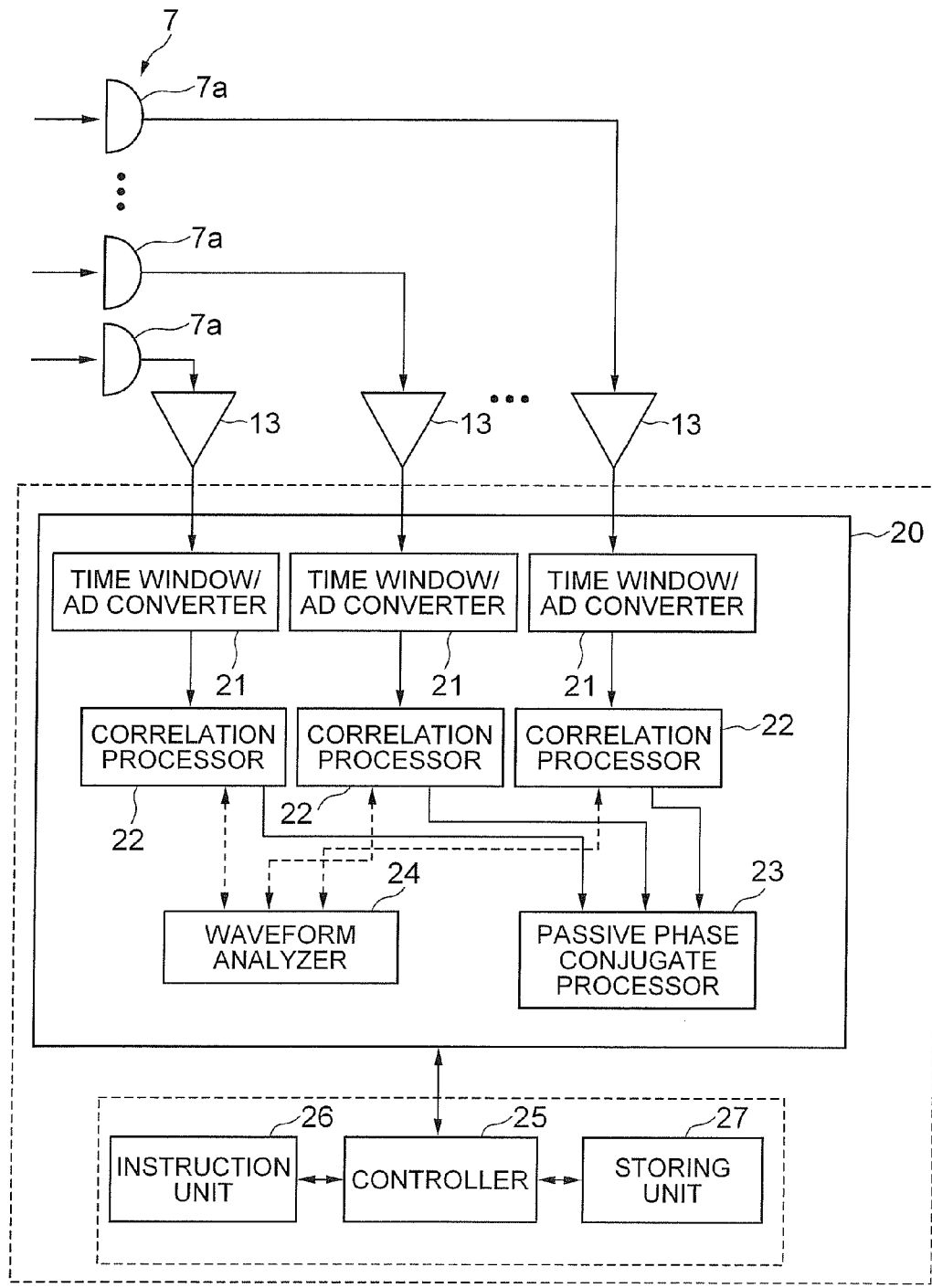
FIG. 3 is a block diagram showing a specific configuration of a passive phase conjugation unit in the exemplary embodiment of the invention.

As shown in FIGS. 1, 2 and 3, a detection device according to the exemplary embodiment includes a pseudo sound source 1 for performing active phase conjugation, a transducer array 2, a receiving array 7, and a monitoring unit 20 which performs passive phase conjugation so as to detect the detection object T.

As shown in FIG. 1, the transducer array 2 and the receiving array 7 are mounted on two survey vessels $8_1$ and $8_2$ sailing the detection sea area in parallel while keeping a distance, and are suspended in the water M from the survey vessels $8_1$ and $8_2$.

As shown in FIG. 1, the transducer array 2 is configured such that a plurality of transducer array elements 2a are linked together with certain intervals. A transducer array element 2 transmits a scanning sound wave 3 generated based on an acoustic signal (electric signal) 1a generated from the pseudo sound source 1 in the water M, and receives a sound wave from a calibration sound source described later and converts the sound wave into a calibration signal (electric signal). The scanning sound wave 3 is an acoustic wave which actually propagates, while scattering, in the water M. As shown in FIG. 1, the receiving array element 7 is configured such that a plurality of receiving array elements 7a are linked with certain intervals. A receiving array element 7a receives the scanning sound wave 3 propagating through the water M and a reflected sound wave 6 reflected at the detection object T, and converts them into a detection signal (electric signal). The reflected sound wave 6 is an acoustic wave which is reflected at the detection object T, and propagates, while scattering, in the water M. Noted that the number of transducer array elements 2a and that of the receiving array elements 7a configuring the transducer array 2 and the receiving array element 7 respectively are selected appropriately while considering the conversion of the scanning sound wave 3 and the receiving sensitivity of the reflected sound wave 6.

The detection device according to the exemplary embodiment is often used for detection in a relatively shallow water area such as a continental shelf because the detection device uses a sound wave. In the case that the sound source is buried in the sediment and the sound source is moved along the sea bottom, if a detection object is an explosive substance like a mine, the sound source may contact the mine and be damaged. Further, there may be a case where the sound source interferes with protrusions on the sea bottom. As such, it is practically difficult to dispose the sound source in the submarine sediments and move the sound source along the sea bottom. Therefore, the exemplary embodiment uses the pseudo sound source 1 which is assumed to be buried in a pseudo manner in the submarine sediments.

As shown in FIG. 2, the pseudo sound source 1 includes an input unit 10, a comparative calibrator 11, an analyzer 12 for analyzing data in the sweeping environment, an acoustic field calculator 14, a conjugate signal generator 15, a distribution synchronization output unit 16, an instruction unit 17, a storing unit 18, and a controller 19.

The input unit 10 takes in a calibration signal which is transmitted into the water from the thrown or suspended calibration sound source and is received and converted by the transducer array 2, removes unnecessary signal components and A/D converts the signal, and the converted digital signal is output to the comparative calibrator 11 as a calibration signal. The calibration signal received by the transducer array 2 is amplified by the amplifier 13 and input to the input unit 10.

The comparative calibrator 11 calculates the difference between the signal from the input unit 10 and the signal from the conjugate signal generator 14 upon reception, and outputs a differential signal to the analyzer 12.

Based on the differential signal from the comparative calibrator 11, the analyzer 12 calculates a constant of the actual sea area, that is, a constant of the actual sea area where the sound wave beam propagates (acoustic constant of the ocean). More specific description will be given below.

The detection device according to the exemplary embodiment is generally used in a relatively shallow water area such as a continental shelf. The acoustic constant of the ocean regarding acoustic propagation in the environment is data including depth, sound speed of the seawater, and submarine sediments (sound speed, density). Further, the acoustic constant of the ocean regarding the sound pulse in the environment is data including the central frequency, spectrum, and the band width of the sound pulse. The depth data for determining the acoustic constant of the ocean is acquired through direct measurement using measuring instruments including a depth sounder. The sound speed data of seawater for determining the acoustic constant of the ocean is calculated with a well-known formula for sound speed including a H. Medwin's formula by measuring the water temperature.

Regarding data of the submarine sediment for determining the acoustic constant of the ocean, although the approximate value can be estimated from the marine chart, a more accurate value is calculated by means of a well-known calibration method. In other words, the data of the sediment in the actual sea area is acquired by receiving a signal transmitted from the calibration sound source suspended in the detection sea area where the detection object is expected to be buried by the transducer array 2, and performing computation while changing the received signal and the predicted constant of the submarine sediment. It should be noted that the acoustic constant of the ocean means environmental factors which affect propagation of sound wave when the sound wave actually propagates in the water.

Data for determining the acoustic constant of the ocean in the actual sea area, regarding the sound wave propagation and the sound pulse, is input to the analyzer 12. The analyzer 12 determines the acoustic constant of the ocean of the actual sea area based on the input data for determining the acoustic constant of the ocean and the differential signal input from the comparative calibrator 11, and outputs the determined acoustic constant of the ocean in the actual sea area to the acoustic field calculator 14.

Before describing the acoustic field calculator 14, the conjugate signal generator 15 and the distribution synchronization output unit 16, acoustic propagation in the water will be described.

Figure 16:
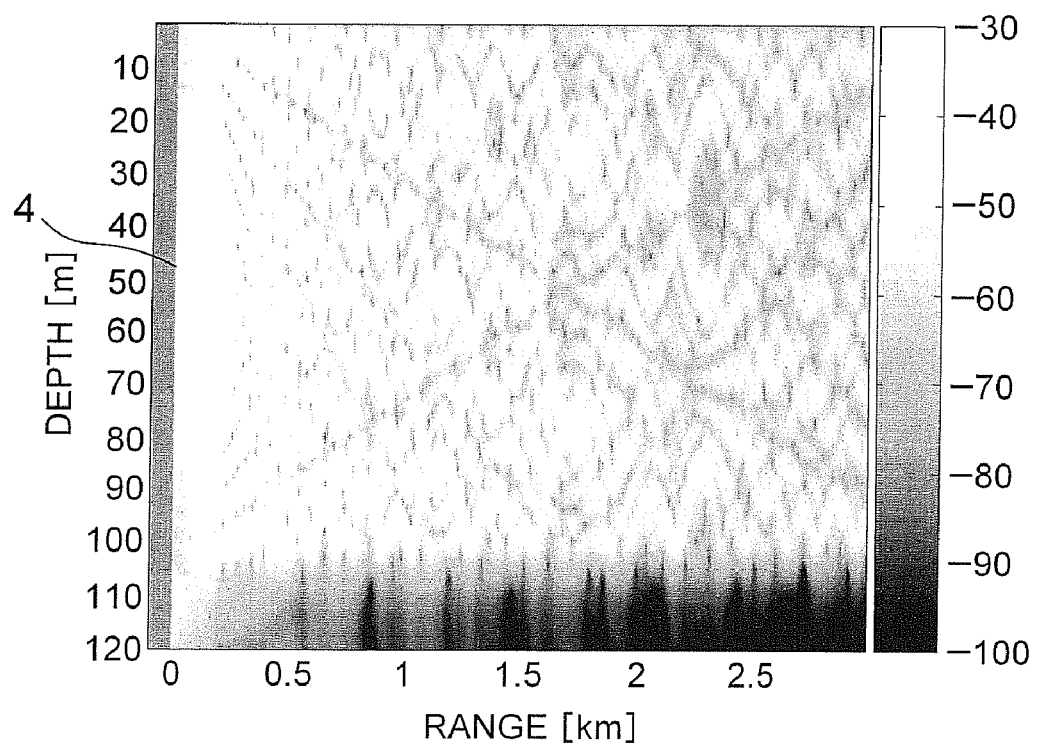
FIG. 16 illustrates a propagating state in a case where a sound wave that is not a phase-conjugate wave diffuses from the sound source.
Figure 17:
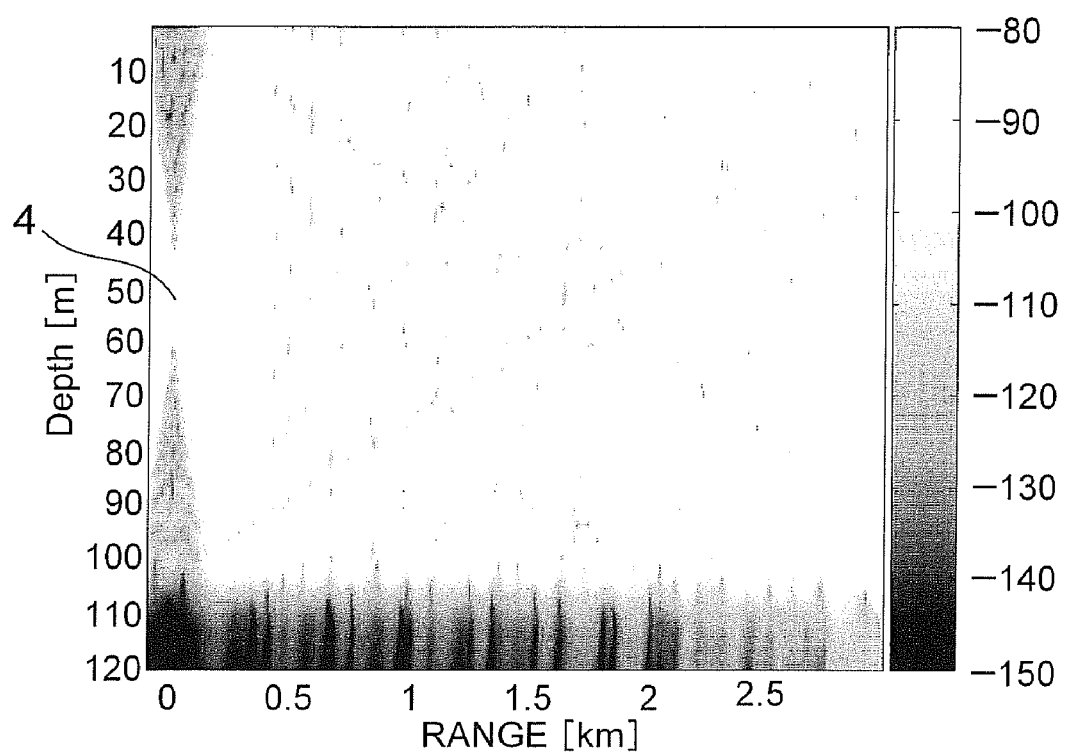
FIG. 17 illustrates a propagating state of a phase-conjugate wave in the frequency domain.

FIG. 16 illustrates a simulation of propagation of a sound wave when the sound wave is transmitted from the sound source 4 in a right direction in the water. In FIG. 16, the sound wave propagates from the sound source 4 on the left side to the right side. FIG. 17 shows a sound pressure distribution in which the sound wave shown in FIG. 16 is time-reversed, indicating by simulation a state that when phase conjugation is performed on the sound wave which diffuses in the water and is received and the sound wave is retransmitted in the water, the sound wave converges on the sound source 4 on the left side. In FIG. 17, the retransmitted sound wave converges on the sound source 4 on the left side from the right side.

As shown in FIG. 17, the sound wave of phase-conjugate wave in the frequency domain, propagating in the water, is refracted based on environmental factors including reflection at the sea surface P, the sea bottom and submarine sediments, and variations in the sound speed due to temperature changes of the seawater. It should be noted that the sound wave of the phase-conjugate wave in the frequency domain is simply referred to as a sound wave when it is described based on FIG. 17.

As the acoustic characteristics of the seawater and those of the submarine sediments are different, a sound wave entering into the submarine sediments is limited to a part thereof, and the almost all parts of it scatter and propagate in the water. FIG. 17 shows simulations of sound pressure distribution of phase-conjugate wave in the frequency domain where the water depth is 100 m, the depth at which the sound source 4 is set is 50 m, the frequency of a sound wave transmitted from the sound source 4 is 500 Hz. In FIG. 17, the part exceeding the water depth 100 m indicates submarine sediments and the like. In FIG. 17, the part having the high sound pressure of the sound wave from the sound source 4 is shown in white, the part having the low sound pressure is shown in black, and the part having the intermediate sound pressure is gray which is in gradation in proportion to the intensity such that the color is close to white as the sound pressure is higher.

Assuming that the sound speed in the water is 1500 m/s, the sound speed in the sea bottom is 1600 m/s, the density of the seawater is 1000 kg/m³, and the density of the sea bottom is 1500 kg/m³, although a part of the sound wave enters the submarine sediments near the sound source 4, when the distance indicated by the horizontal axis in FIG. 16 exceeds about 100 m, the sound wave seldom enters into the submarine sediments, and scatters while being reflected at the sea surface and the sea bottom, as shown in FIG. 16.

As obvious in FIG. 16, the sound wave transmitted from the sound source 4 disposed in the water propagates while scattering in the water M. In the case of FIG. 16, the sound wave from the sound source 4 disposed on the left side scatters and propagates from the left side to the right side of FIG. 16. As shown in FIG. 17, however, in the case of a phase-conjugate wave which has been researched recently, it is known that even a sound wave which has reflected and refracted repeatedly in a complicated environment, when it is received and performed with phase conjugation and then retransmitted in the water, the sound wave converges on the point from which it was originally transmitted, that is, the sound source 4.

The acoustic field of the phase-conjugate wave is calculated from the following equation (1):

$$G_\omega(r, r_s) = \sum_{n=1}^{N} G_\omega^*(r_n, r_s) G_\omega(r, r_n) \tag{1}$$

The equation (1) is established in a document "Phase conjugation in underwater acoustics" by D. R. Jackson and D. R. Dowling, J. Acoust. Soc. Am, 89,171 (1991).

The variables will be described by corresponding the equation (1) to the configuration of FIG. 1. In the equation (1), a variable $G_\omega(r_n, r_s)$ is a Green's function which affects from a position $r_s$ of the sound source 4 disposed in the water to a position $r_n$ of the nth transmission element of the transducer array. A variable $G_\omega(r, r_n)$ is a Green's function which affects from a position $r_n$ of the nth transmission element of the transducer array to an arbitrary point r. N indicates the number of transmission elements of the transducer array, and * indicates conjugation. As a Green's function can be deemed to be an acoustic field function regarding the acoustic field formed by a sound wave emitted from the sound source, the sound pressure at a point within the acoustic field can be calculated by means of a normal mode method or a coupled mode method. For example, a method of calculating the sound pressure within an acoustic field using a coupled mode method is described in a document "Computational Ocean Acoustics" by F. B. Jense, W. S. Kuperman, M. B. Porter, W. L. Porte, and H. Schmidt, AIP Press, New York 1994.

Although the phase-conjugate wave in the frequency domain described above is suitable for describing the principles because it can express the acoustic field visually as shown in FIGS. 16 and 17, it is difficult to put it to practical use as it is. That is, a phase-conjugate wave in the frequency domain equals to the acoustic field of a continuous wave. Therefore, in the case that the phase-conjugate wave in the frequency domain converges on the detection object, a reflected wave from the detection object is continuous sound wave signals, so it is difficult to separate and identify the reflected wave.

In view of the above, in the exemplary embodiment, the scanning sound wave 3 is generated by performing active phase processing (time reversal processing) on a phase-conjugate wave in the time domain, that is, the acoustic signal 1a emitted from the pseudo sound source 1, instead of the phase-conjugate wave in the frequency domain. More specific description will be given.

As shown in FIGS. 2 and 3, the acoustic field calculator 14 computes the sound pressure of the acoustic signal 1a, which is assumed to be emitted from the pseudo sound source 1 and received by each element 2a of the transducer array 2 which is a receiving point, based on the equation (2), calculates the acoustic field (phase conjugate field) by the acoustic signal 1a (propagation calculation S1), and forms the waveform of a base signal W1 (waveform formation S2).

$$p(r, z; t) = \sum_{n=1}^{N} \int G_\omega(r; z, z_n) G^*(R; z_n, z_s) S^*(\omega) e^{-i\omega t} d\omega \tag{2}$$

The variables in the equation (2) will be described. A variable S(ω) indicates a frequency spectrum of the acoustic signal 1a emitted from the pseudo sound source 1. Although the frequency spectrum S(ω) differs depending on the waveform of the acoustic signal 1a, as a pulse of a tone burst wave is generally used as the acoustic signal 1a, the acoustic field calculator 14 calculates the frequency spectrum S(ω) by performing Fourier transform on the waveform of a pulse-state tone burst wave.

In the equation (2), a variable P(r,z;t) is a sound pressure at any point (r, z) of a sound wave of an angular frequency ω. According to the sound wave propagation theory, this can be used for a normal mode method, a coupled-mode method, a parabolic equation method or the like. In the description below, a coupled-mode method is used in order to reduce errors in the variable showing the sound pressure.

The acoustic field calculator 14 calculates the variable P(r,z;t) at any point (r, z) of the sound wave of the angular frequency ω using the coupled-mode method according to the equation (3):

$$P_j = \sum_{m=1}^{M} \{A_{j,m} H1_{j,m}(r) + B_{j,m} H2_{j,m}(r)\} \phi(z, \lambda_{j,m}) \tag{3}$$

where j indicates divided areas in a horizontal direction, $\emptyset(z, \lambda_{j,m})$ is a mode function, and A and B are amplitudes.

The equation (3) is established in "A coupled mode solution for acoustic propagation in a waveguide with stepwise depth variations of a penetable bottom" by R. B. Evans, J. Acoust. Soc. Am., 74, 188-193 (1983).

In the equation (3), $$H1_{j,m}(r) = \frac{H_0^{(1)}(l_{j,m}r)}{H_0^{(1)}(l_{j,m}r_{j-1})} \tag{4}$$

$$H2_{j,m}(r) = \frac{H_0^{(2)}(l_{j,m}r)}{H_0^{(2)}(l_{j,m}r_{j-1})} \tag{5}$$

Ho is a zero-order Hankel function, $Ho^{(1)}$ is the first class Hankel function, and $Ho^{(2)}$ is the second class Hankel function. $\emptyset(z, \lambda_{j,m})$ is a mode function, $A_{j,m}$ and $B_{j,m}$ are amplitude coefficients. The subscripts j and m are the number of area domains and the mode number in a horizontal direction, respectively. By using a well-known method, the acoustic field calculator 14 calculates values of the mode function and the amplitude coefficients based on the acoustic constant of the ocean in the actual sea area determined by the analyzer 12.

Figure 4:
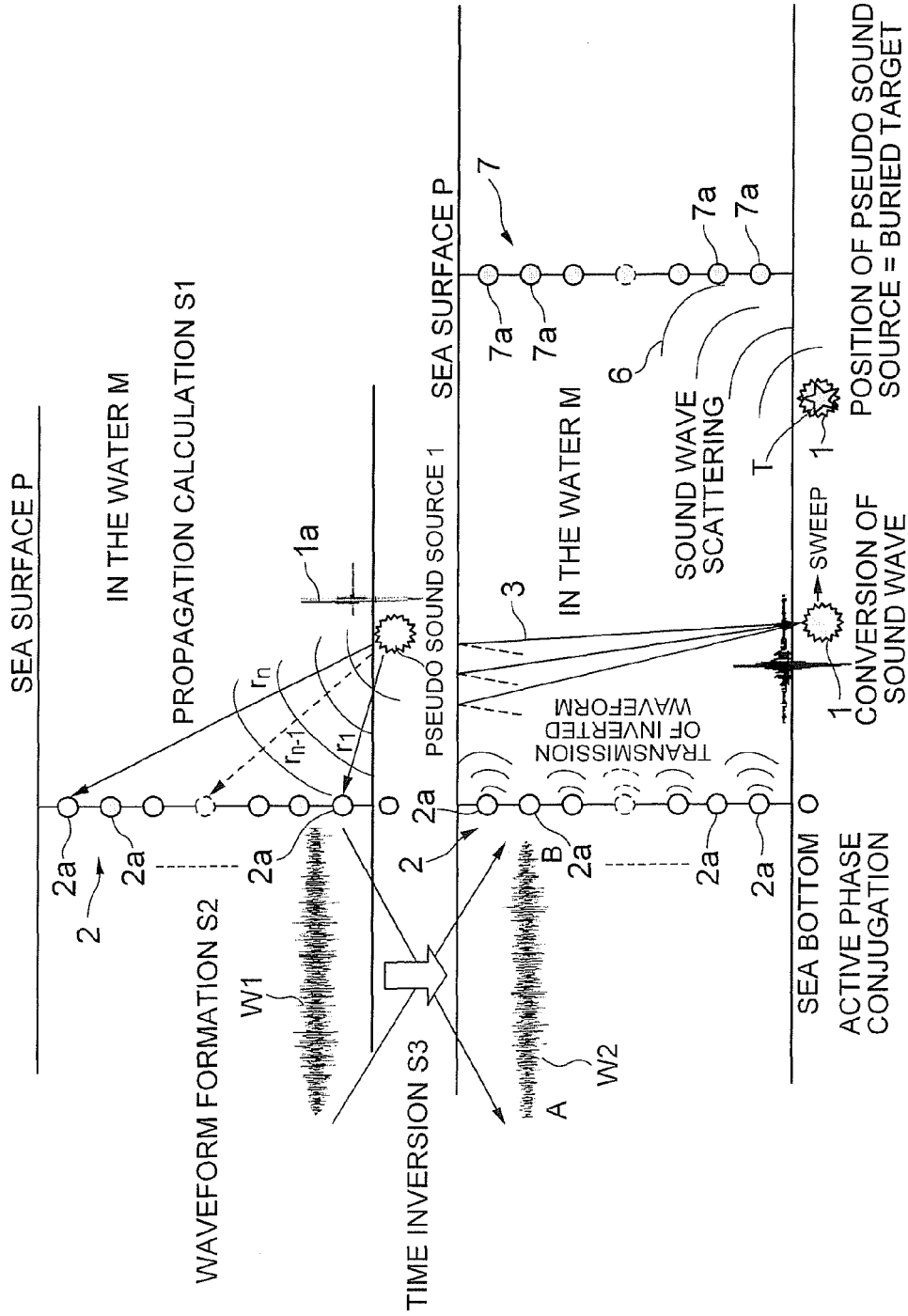
FIG. 4 illustrates a series of operations of generating a scanning sound wave by a pseudo sound source and transmitting the scanning sound wave from a transducer array in the exemplary embodiment of the invention.

The distances r1, r2, r3 . . . rn from the pseudo sound source 1 to respective transmission elements 2a of the transducer array 2, calculated by the acoustic field calculator 14, are calculated in the following manner. That is, as shown in FIG. 4, assuming that the depth in a vertical direction of each of the transmission elements 2a from the intersection O between the transducer array 2 which is suspended vertically and the bottom of the sea is zn, and the lateral distance from the intersection O to the pseudo sound source 1 is xn, the distance r (r1, r2, r3, . . . rn) from the pseudo sound source 1 to each of the transducer array elements 2a is calculated according to the following equation (6), in which the distance r corresponds to the variation r in the equation (2):

$$r_n = \sqrt{x_n^2 + z_n^2} \qquad (6)$$

where the subscript n to x and z corresponds to the subscript of the distance r of each of the transducer array elements 2a from the pseudo sound source 1.

As described above, the acoustic field calculator 14 calculates a distance r (r1, r2, r3 . . . rn) from the pseudo sound source 1 to each of the transducer array elements 2a of the transducer array 2, and calculates a mode function and an amplitude function based on the ocean constant of the actual sea area determined by the analyzer 12, and based on such information, calculates the sound pressure at any point within the acoustic field formed by the acoustic signal 1a of the angular frequency ω according to the equation (3). Further, the acoustic field calculator 14 assigns the equation (3) to the equation (2), and calculates a frequency spectrum S(ω) by performing Fourier transform on the waveform of the pulse-state tone burst wave to thereby assigns the frequency spectrum S(ω) to the equation (2), and based on the equation (2), calculates the sound pressure based on the acoustic signal 1a emitted from the pseudo sound source 1 to thereby form the waveform of the base signal W1.

Figure 5:
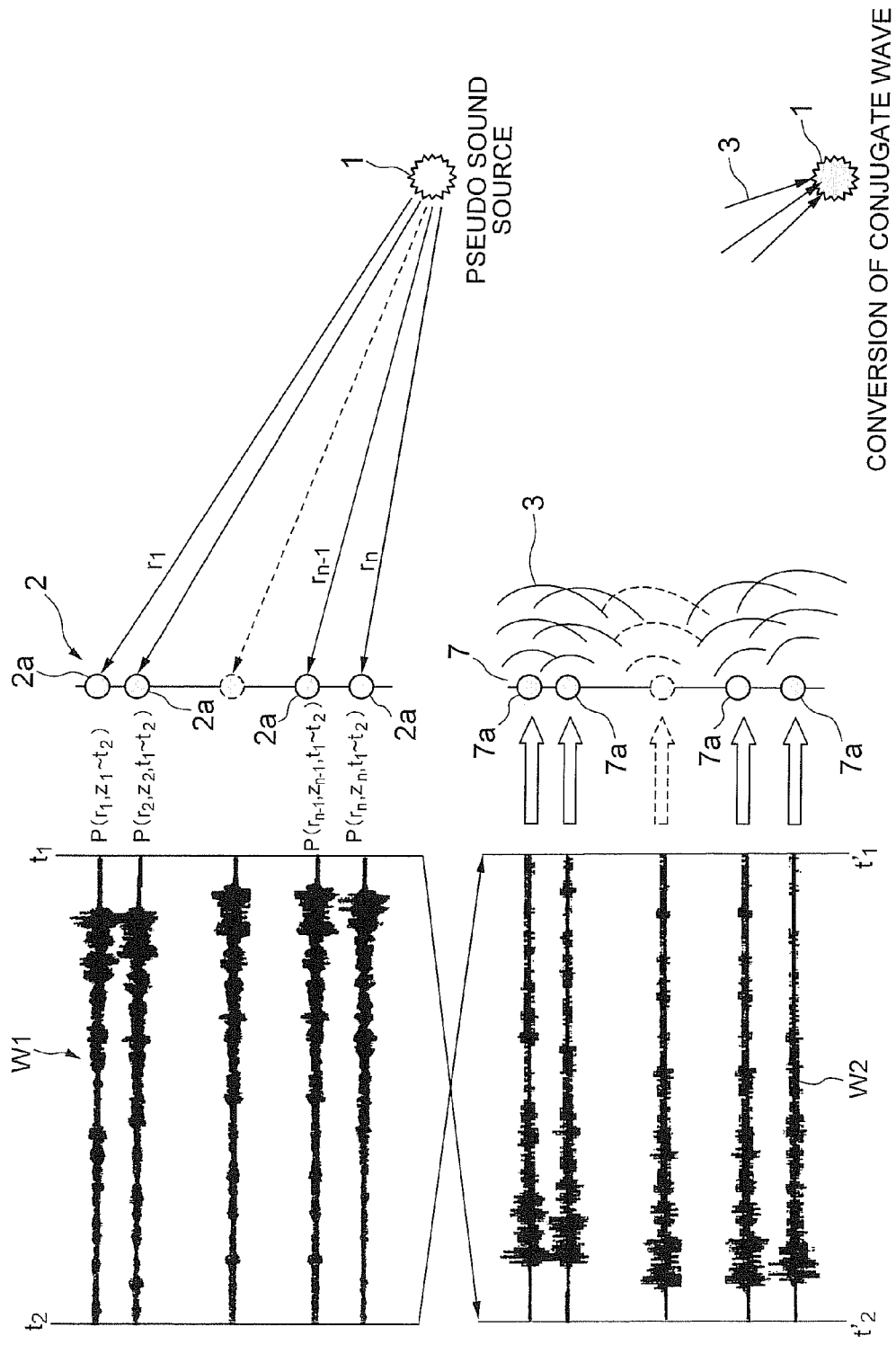
FIG. 5 illustrates a series of operations of generating a scanning sound wave by a pseudo sound source and transmitting the scanning sound wave from a transducer array in the exemplary embodiment of the invention.

In other words, as shown in FIG. 5, the acoustic field calculator 14 forms a base signal W1 such as P(r1, z1, t1~t2), P(r2, z2, t1~t2), P(rn-1, zn-1, t1~t2) or P(rn, zn, t1~t2) for each of the transducer array elements 2a. The base signal W1 indicated as P(r1, z1, t1~t2), P(r2, z2, t1~t2), . . . P(rn-1, zn-1, t1~t2) or P(rn, zn, t1~t2) has a pulse length of t1~t2. The pulse length is indicated as a time difference between a time t1 when the sound wave reaches first and a time t2 when the sound wave reaches at last. In FIG. 5, the respective base signals W1 of P(r1, z1, t1~t2), P(r2, z2, t1~t2), . . . P(rn-1, zn-1, t1~t2) and P(rn, zn, t1~t2) are formed with time shifts, because the propagation distances r1, r2 . . . rn from the pseudo sound source 1 to the respective transducer array elements 2 of the transducer array 2 differ respectively.

The acoustic field calculator 14 synchronizes base signal W1 having a pulse length t1-t2 as shown in FIGS. 4 and 5 and outputs it to the conjugate signal generator 15.

The conjugate signal generator 15 receives data of the base signal W1 from the acoustic field calculator 14 and performs time inversion on the base signal W1 to thereby generate a phase conjugate signal W2 in the time domain.

More specifically, the base signal W1 output from the acoustic field calculator 14 is formed for each of the transducer array elements 2a as P(r1, z1, t1~t2), P(r2, z2, t1~t2), . . . P(rn-1, zn-1, t1~t2) or P(rn, zn, t1~t2). A base signal W1 indicated as P(r1, z1, t1~t2), P(r2, z2, t1~t2), . . . P(rn-1, zn-1, t1~t2) or P(rn, zn, t1~t2) has a pulse length of t1~t2.

As shown in FIGS. 4 and 5, the conjugate signal generator 15 performs time inversion on the base signal W1 formed by the acoustic field calculator 14, and generates a phase-conjugate wave W2 having a pulse length of t1'-t2' in the time domain. The phase-conjugate wave W2 performed with time inversion by the conjugate signal generator 15 is a signal wave shown as P(r1, z1, t'1~t'2), P(r2, z2, t'1~t'2), . . . P(rn-1, zn-1, t'1~t'2) or P(rn, zn, t'1~t'2), and the pulse length t1'-t2' is the same as the pulse length t1-t2 of the base signal W1 formed by the acoustic field calculator 14 but time-reversed. The conjugate signal generator 15 outputs the time-reversed phase-conjugate wave W2 in the time domain to the distribution synchronization output unit 16.

As shown in FIGS. 4 and 5, the distribution synchronization output unit 16 distributes the phase-conjugate wave W2 from the conjugate signal generator 15 to respective transducer array elements 2a of the transducer array 2, and in order to use a feature that the scanning sound wave 3 based on the time-reversed phase-conjugate wave W2 converges on the pseudo sound source 1 which is the generation source of the acoustic signal 1a, synchronizes the respective phase-conjugate waves W2 of P(r1, z1, t'1~t'2), P(r2, z2, t'1~t'2), . . . P(rn-1, zn-1, t'1~t'2) and P(rn, zn, t'1~t'2) and outputs them from the respective transducer array elements 2a of the transducer array 2 simultaneously. The distribution synchronization output unit 16 amplifies the phase-conjugate waves W2 with the amplifier 13 and supplies them to the respective transducer array elements 2a of the transducer array 2.

When the transducer array 2 receives the phase-conjugate waves W2 in the time domain from the distribution synchronization output unit 16, the transducer array 2 converts the phase-conjugate waves W2, which are electric signals, into acoustic signals which propagate through the water M, and transmits the scanning sound wave 3 from the respective transducer array elements 2a toward the water M which is the propagation space. As the transducer array 2 is suspended from the survey vessel 8₁, the scanning sound wave 3 is transmitted horizontally in the undersea M, that is, in a direction toward the facing survey vessel 8₂.

Figure 9:
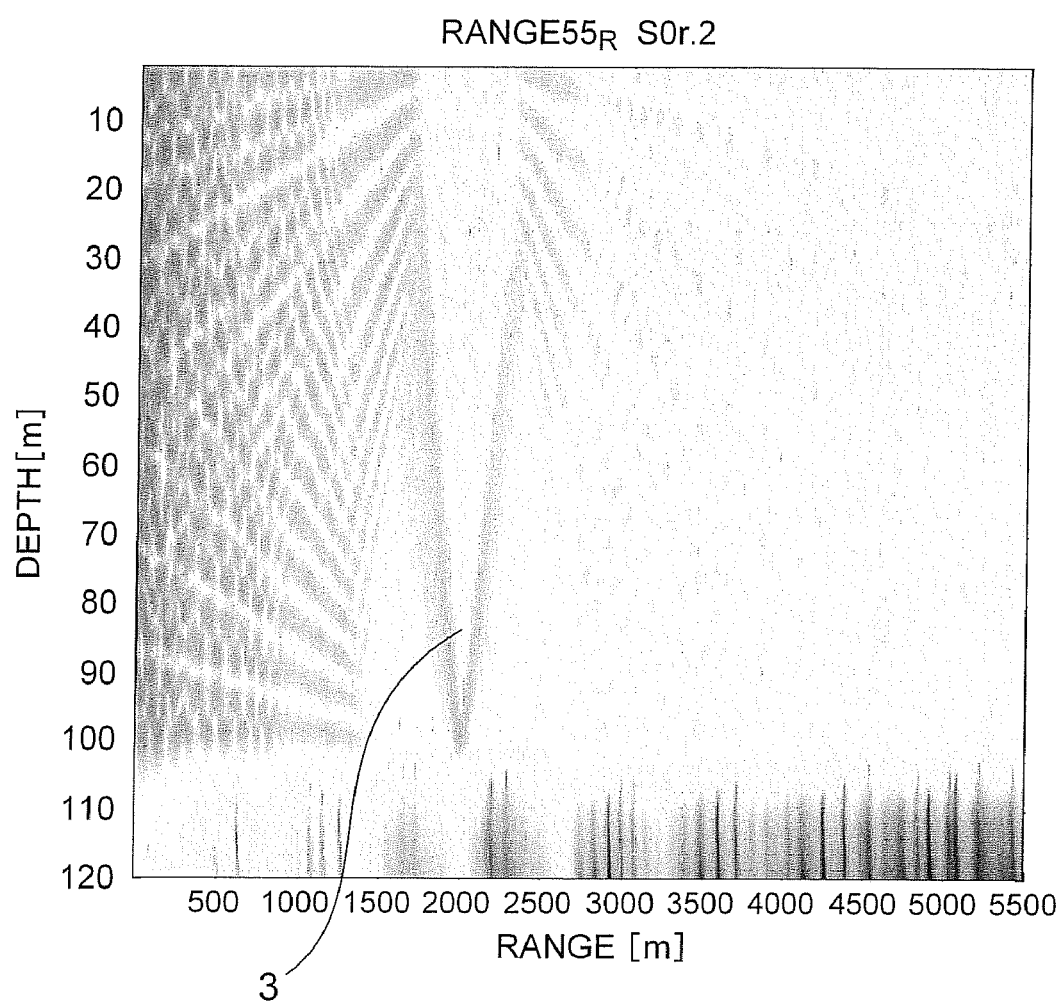
FIG. 9 illustrates a state in which a sound wave transmitted from a transducer array converges on the position of the original pseudo sound source.

As described above, according to the recent search result, the scanning sound wave 3 transmitted from the transducer array elements 2a of the transducer array 2, that is the phase-conjugate wave in the time domain, is characterized as to converge on the pseudo sound source 1 which is the generation source of the acoustic signal 1a, as shown in FIGS. 4, 5 and 9.

In this way, the pseudo sound source 1 transmits the scanning sound wave 3 in the water M through the transducer array 2 using a feature that the scanning sound wave 3 generated by active phase processing with respect to the acoustic signal (electric signal) 1a emitted from the pseudo sound source 1 converges on the pseudo sound source 1 which is the generation source of the acoustic signal 1a as shown in FIGS. 4, 5 and 9. The sound pressure when the scanning sound wave 3 transmitted from the transducer array elements 2a of the transducer array 2 converges on the pseudo sound source 1 which is the generation source of the acoustic signals 1a is calculated from the equation (7).

$$P(r, z; \omega) = \sum_{n=1}^{N} G_\omega(r; z, z_n) G_\omega^*(R; z_n, z_s) \qquad (7)$$

In the equation (7), a variable $G_{\omega(R;z_n,z_s)}$ is a Green's function affecting the depth $Z_n$ of the nth transducer array element 2a of the transducer array 2 from the depth $z_s$ of the sound source where the pseudo sound source 1 is assumed to be provided. A variable R corresponds to a distance between the pseudo sound source 1 and the transducer array 2. A variable $G_\omega(r,z,z_n)$ is a Green's function affecting any arbitrary point (r,z) in the water M from the depth $z_n$ of the nth transducer array element 2a of the transducer array 2. "*" indicates conjugate.

The controller 19 collectively controls the operation of the pseudo sound source 1. The controller 19 controls a series of operation including generation and distribution of base signal W1 and phase-conjugate wave W2 in the time domain by the acoustic field calculator 14, the conjugate signal generator 15, and the distribution synchronization output unit 16, by sequentially moving the position of the pseudo sound source 1 with respect to the transducer array 2 in a pseudo manner, that is, as shown in FIG. 1, moving the position of the pseudo sound source 1 in the submarine sediment from one survey vehicle 8₁ to the other survey vehicle 8₂ in a pseudo manner, so as to scan the detecting sea area with the scanning sound wave 3.

The storing unit 18 supplies information necessary for the operation of the controller 19 and the work domain necessary for computation, and the instruction unit 17 outputs data which is output through the controller 19 to the outside.

Although the case of constructing the pseudo sound source 1 in the exemplary embodiment shown in FIG. 2 as hardware has been described above, the present invention is not limited to this configuration. It is also acceptable to configure the functions of the input unit 10, the comparative calibrator 11, the analyzer 12, the acoustic field calculator 14, the conjugate signal generator 15, and the distribution synchronization output unit 16, which configure the pseudo sound source 1, as software which is to be performed on programs.

Next, the pseudo sound source 1 of the exemplary embodiment will be verified.

The characteristics of a phase-conjugate wave in the frequency domain can be clarified by investigating the convergence characteristics of the original sound source. In contrast, the characteristics of a phase-conjugate wave in the time domain (scanning sound wave 3) of the exemplary embodiment can be shown by the generation characteristics of a sound pulse at the setting position of the original pseudo sound source 1.

Generally, a sound source pulse emitted from the sound source may be a tone burst wave or a Gaussian distribution pulse. In the exemplary embodiment, a tone burst wave having the central frequency of 500 Hz and the pulse width of 10 cycles is used. The tone burst wave provides a frequency spectrum ($S(\omega)$ in the equation (2)) of a sound pulse through Fourier transform. It should be noted that the tone burst wave is not limited to the example described above.

Figure 10A:
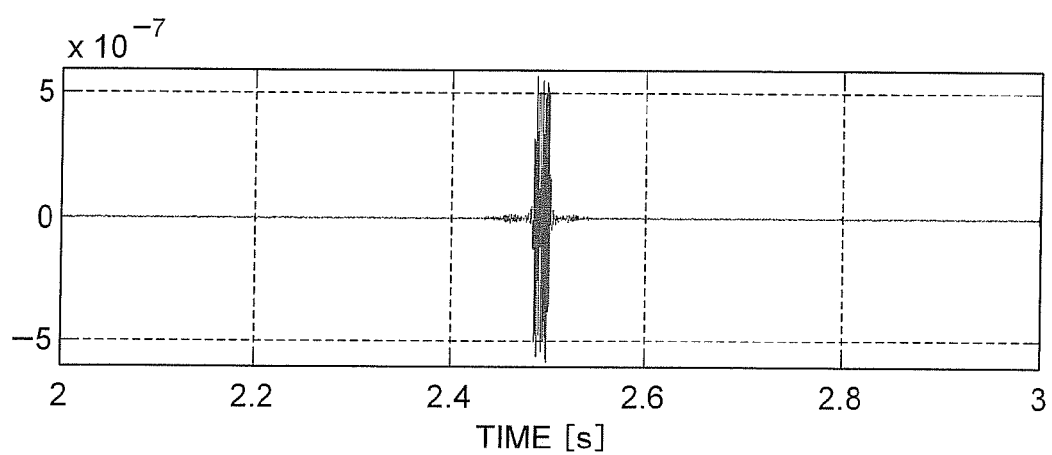
FIG. 10A illustrates a result of verifying a pseudo sound source, showing a state where the result coincides with a sound wave transmitted from the pseudo sound source.
Figure 10B:
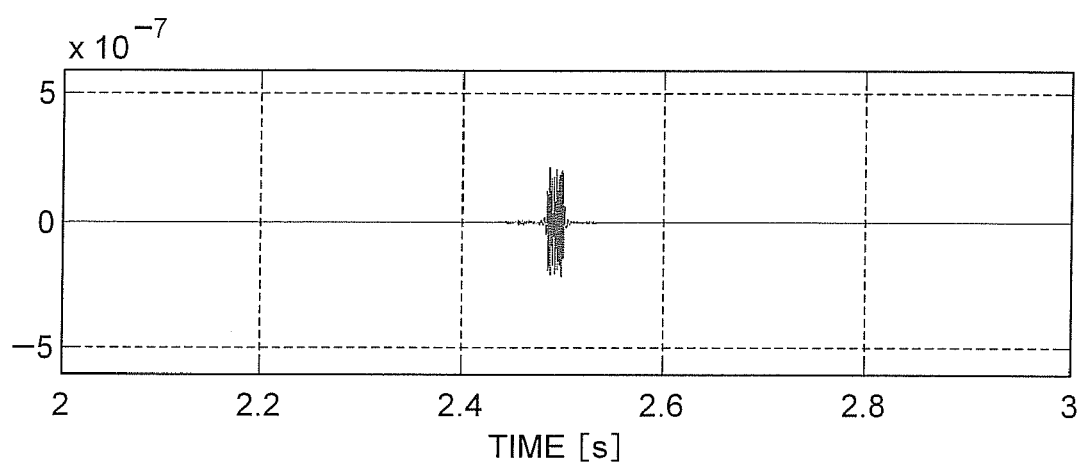
FIG. 10B illustrates a result of verifying a pseudo sound source, showing a state where the result coincides with a sound wave transmitted from the pseudo sound source.

FIGS. 10A and 10B show a result in which, under the acoustic constant of the ocean in the actual sea area determined by the analyzer 12, in the scanning sound wave 3 which is generated through active phase processing performed on a sound pulse (acoustic signal 1a) emitted from the pseudo sound source 1 of 2100 m distant and 101 m deep in the water M, and received by the transducer array 2 and time-inverted, and retransmitted in the water M, the sound wave converged near the original pseudo sound source 1 is simulated. The distance shows a distance up to the position of 2100 m away from the other survey vessel 8₂ with reference to the position of the one survey vessel 8₁.

FIGS. 10A and 10B show waveforms of a scanning sound wave 3, which is generated based on the acoustic signal 1a from the pseudo sound source 1 assumed to be disposed at a depth of 102 m and is transmitted, at a position of the sea bottom (100 m deep) which is 2100 m away from the wave transmitting position. FIG. 10B shows a waveform of the scanning sound wave 3 which is generated based on the acoustic signal 1a from the pseudo sound source 1 assumed to be set at a depth of 102 m and is transmitted, at a position (position of the original pseudo sound source 1 where the scanning sound wave 3 converges) in the submarine sediment (102 m deep) which is 2100 m away from the wave transmitting position. In FIGS. 10A and 10B, the horizontal axis indicates time, and the vertical axis indicates amplitude of a pulse.

In FIGS. 10A and 10B, it is found that although the waveform is slightly deformed because the spectrum of the acoustic signal 1a emitted from the pseudo sound source 1 has a limited value, the waveform of the scanning sound wave 3 shown in FIG. 10B is close to the original waveform of the acoustic signal 1a shown in FIG. 1. As obvious from FIGS. 10A and 10B, there is substantially no sidelobe which may be present before or after a pulse. Therefore, it can be understood that the pulse of the acoustic signal 1a provided by the pseudo sound source 1 is reproduced almost completely as a pulse of the scanning sound wave 3 which is to be transmitted actually in the water M. Although there is a difference between the amplitudes of the waveforms in FIGS. 10A and 10B, the difference may be an effect of reflection at the surface of the bottom and the like.

Figure 11:
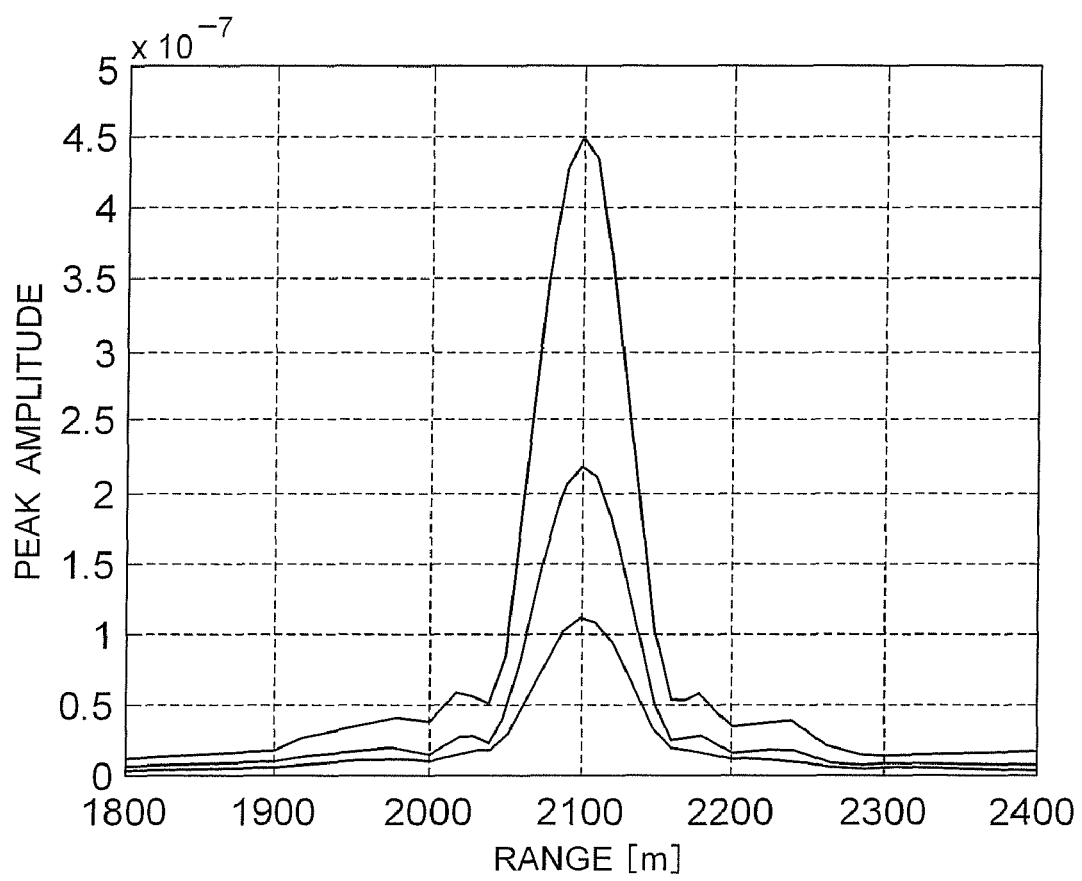
FIG. 11 illustrates a result of verifying a pseudo sound source, showing the result of verifying how the amplitude of a sound pulse varies by changing the depth in an area where scanning sound wave converges in the sea bottom.

The characteristics of the scanning sound wave (pulse) 3 provided from the pseudo sound source 1 is needed to be verified spatially, in addition to the temporal characteristics described above. FIG. 11 shows a result of searching how the scanning sound wave 3 to be transmitted from the transducer array 2 changes near the original pseudo sound source 1. FIG. 11 is a chart showing the result of simulating horizontal amplitude distribution of the scanning sound wave 3 converging near the pseudo sound source 1.

FIG. 11 indicates a result of plotting, at depths of 100 m, 101.5 m and 103 m, the pulse widths of the scanning sound waves 3, generated based on the acoustic signal 1a from the pseudo sound source 1 and transmitted, on how to change horizontally in the process of converging on the original pseudo sound source (pseudo sound source on which transmitted scanning sound waves 3 converge) assumed to be provided at the depth of 102 m.

As obvious from FIG. 11, each scanning sound wave 3 shows a single-peeked acute amplitude distribution, having almost no sidelobe in a lateral direction. In other words, it is possible to make the clear pulse-state scanning sound waves 3, having the same characteristics as those of the acoustic signal 1a provided from the original pseudo sound source 1, converge on the position of the original pseudo sound source 1 within a narrow range.

Considering from the verification described above, it can be proved that the scanning sound waves 3 are made incident on the detection object T from the above thereof by emitting a sound wave from a position away from the immediately above the detection object T by using the pseudo sound source 1, without actually providing a sound source to the submarine sediment.

Next, description will be given for the configuration of the monitoring unit 20 for detecting a detection object T according to presence or absence of a reflected sound wave 6, by performing passive phase conjugation to the sound wave which scatters and propagates in the water and is received, and extracting a reflected sound wave 6 reflected at the detection object T in the water M.

As shown in FIG. 3, the monitoring unit 20 includes a time window/AD converter 21 and a correlation processor 22 which are provided for each of the receiving array elements 7a of the receiving array element 7, a passive phase conjugate processor 23 which receives data from a plurality of correlation processors 22 and performs passive processing, a waveform analyzer 24 which receives data from a plurality of correlation processors 22 and performs processing, a controller 25, an instruction unit 26, and a storing unit 27.

The receiving array element 7 converts sound waves propagating through the water M including reflected sound waves 6 reflected at the detection object T shown in FIG. 1 into wave receiving signals which are electric signals, and outputs the wave receiving signals to the time window/AD converter 22. As shown in FIG. 1, as a scanning sound wave 3 transmitted from the transducer array 2 scatters and propagates through the water M and a part thereof converges on the position of the original pseudo sound source 1, when the pseudo sound source 1 and the detection object T coincide with each other by sweeping the pseudo sound source 1, the scanning sound wave 3 is reflected at the detection object T, and propagates toward the wave reception array 7 as a reflected sound wave 6. It should be noted that as some scanning sound waves 3 are not reflected at the detection object T and directly propagate to the receiving array element 7, the receiving array element 7 receives not only the reflected sound waves 6 but also other scanning sound wave 3.

The time window/AD converter 21 extracts only signals necessary for analysis among signals output from the receiving array element 7a of the receiving array element 7, AD-converts the extracted signals into digital signals, and output the digital signals to the correlation processor 22.

Figure 12:
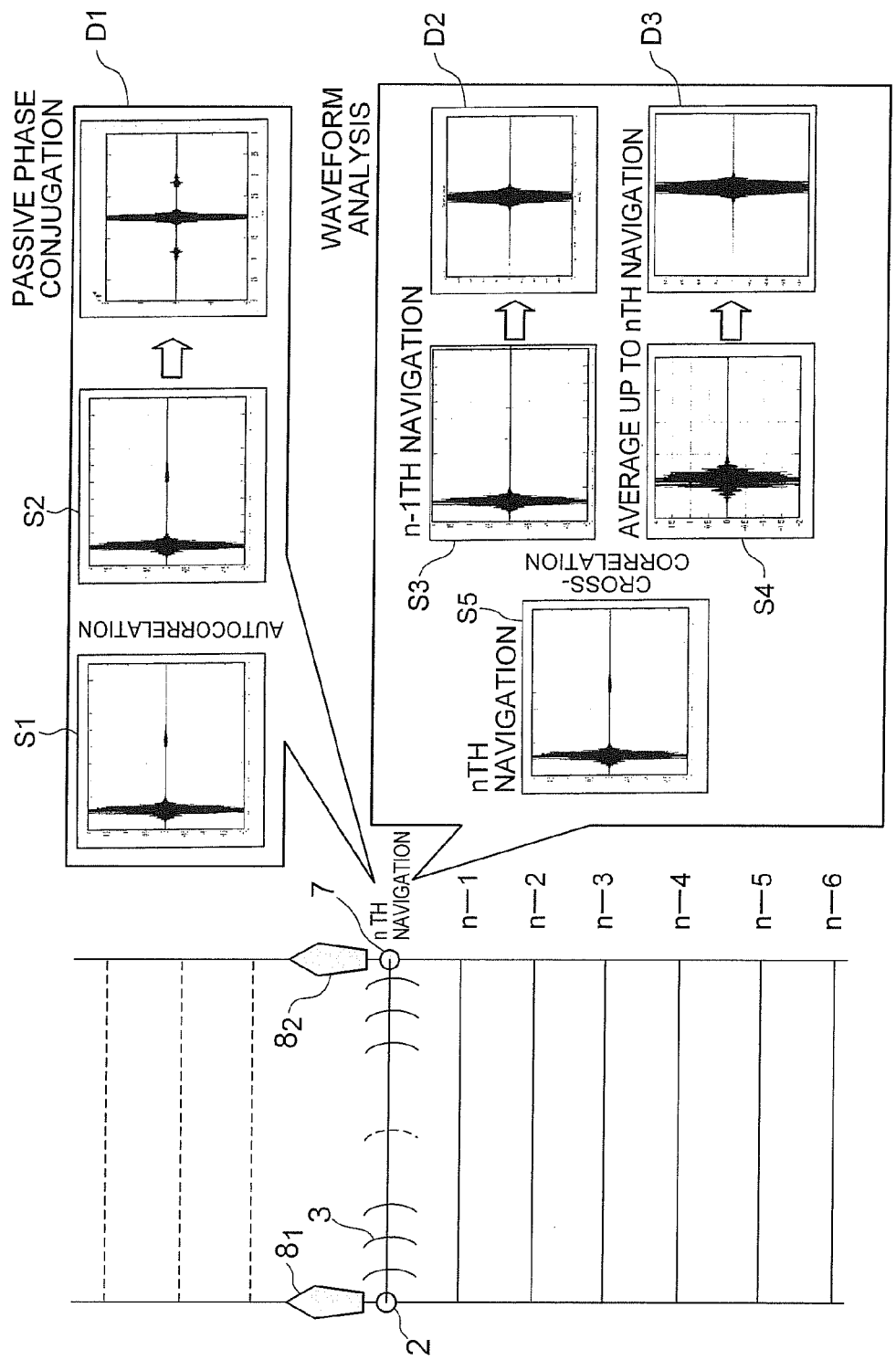
FIG. 12 illustrates specific operation of passive phase conjugation in the exemplary embodiment of the invention.

As shown in FIG. 12, the correlation processor 22 handles the signals output from each time window/AD converter 21 as reference signals S1 and data signals S2 to thereby perform autocorrelation between the reference signals S1 and the data signals S2. Further, as shown in FIG. 12, the correlation processor 22 sets the data acquired by the previous sweeping of the pseudo sound source 1 stored in the waveform analyzer 24 to be reference signals S3 and S4, and sets data acquired by the current sweeping of the pseudo sound source 1 to be data signals S5, and performs cross-correlation between the reference signals S3 and S4 and the data signals S5, to thereby calculates a correlation value. The correlation processor 22 output the correlation value data acquired through the auto-correlation processing and the cross-correlation processing to the passive phase conjugate processor 23.

$$R_{id}(r_m; t) = \int_0^T P_d(r_m; t' + t) P_i(r_m; t') dt' \tag{8}$$

In the equation (8), $P_d$ and $P_i$ are the reference signal and the data signal made incident on the position $r_m$ of the mth receiving array element 2a of the receiving array element 7. Therefore, $R_{id}$ is a correlation value of the reference signal and the data signal.

As shown in FIG. 12, by moving the position of the pseudo sound source 1 from one survey vessel $8_1$ to the other survey vessel $8_2$ in a pseudo manner (sweeping of the pseudo sound source 1), the detection object T within the detection area is detected. If the detection object T cannot be detected as a result of the sweeping of the pseudo sound source 1, the positions of the survey vessels $8_1$ and $8_2$ are moved to n-6th, n-5th, n-4th, n-3th, n-2th, n-1th, and nth navigations as shown in FIG. 12 for example to detect the detection object T.

The waveform analyzer 24 acquires data by the autocorrelation processing by the passive phase conjugate processor 23 obtained in each navigation, and stores data S3 of up to n-1$^{th}$ navigation, calculates the average value of data up to the nth navigations, and stores the data S4 of the average value.

When the passive phase conjugate processor 23 receives the signals which are auto-correlated by the correlation processor 22, the passive phase conjugate processor 23 performs passive phase conjugation based on the equation (9).

$$S(t) = \sum_{m=1}^{M} w_m R_{id}(r_m; t) \tag{9}$$

The passive phase conjugation based on the equations (8) and (9) is established in the "Underwater Acoustic Communication by Passive-Phase Conjugation: Theory and Experimental Results" by D. Rouseff, D. R. Jackson, W. L. Fox, C. D. Jones, J. A. Ritcey and D. R. Dowing, IEEE J. Ocanic Eng., 26, 821-831 (2001).

The correlation value $R_{id}$ calculated based on the equation (8) by the correlation processor 22 is a correlation value between the reference signal and the data signal. For this correlation value, it is known that a value S(t) (equation (9)) added by the total number M of the receiving array elements 7a of the receiving array element 7 has phase conjugate property equivalently. In other words, it is known that the scanning sound wave 3 by the active phase conjugation by the pseudo sound source 1 shown in FIG. 2 converges on the detection object T in which the position coincides with the pseudo sound source 1, that is, it becomes equivalent to the reflected sound wave 6 at the position of the detection object T. In other words, the passive phase conjugate processor 23 compresses the reflected sound wave 6 which is reflected at the detection object T and then gradually extend so as to be changed to have a complicated shape, based on the equation (9). It should be noted that $W_m$ in the equation (9) is a weighting coefficient which corrects variations of the receiving array elements 7a of the receiving array element 7.

Processing by the passive phase conjugate processor 23 and the correlation processor 22 will be described more specifically. In the sea area where the detection object T is expected to be buried in the submarine sediment, scanning is performed along the sea bottom with the scanning sound waves 3 from the pseudo sound source 1 based on the active phase conjugation. If the scanning sound wave 3 contacts the detection object T buried in the submarine sediment on the sea bottom at a certain distance, a reflected sound wave 6 is reflected from the detection object T. The reflected sound wave 6 is received by the receiving array element 7 suspended from the survey vessel $8_2$.

However, the reflected sound wave 6 reflected at the detection object T scatters and propagates in the water M. Then, the reflected sound wave 6 is reflected at the sea surface or at the sea bottom and extended so as to be changed to be a pulse of a complicated shape. In order to return the changed sound pulse to the waveform of the reflected sound wave 6 reflected at the detection object T, the passive phase conjugation method will be applied.

In the passive phase conjugation, different processing methods are used for (1) the case where a reference signal and a data signal are the same and (2) the case where a reference signal and a data signal are different. The passive phase conjugate processor 23 performs the autocorrelation processing when it is the case of (1), and performs cross-correlation processing when it is the case of (2).

Figure 8:
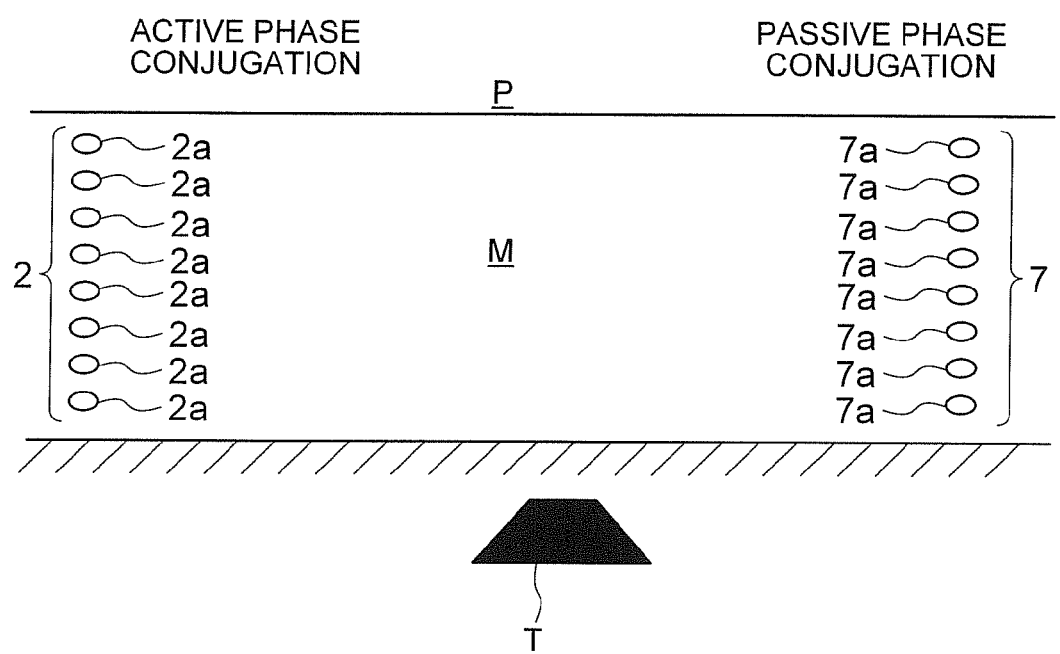
FIG. 8 illustrates a case of detecting a detection object in the exemplary embodiment of the invention.

FIG. 8 shows the positional relationship between the detection object T buried in the sea bottom, the transducer array 2, and the receiving array element 7. Although description is given using an example in which the distance between the transducer array 2 and the detection object T is 2.1 km and the distance between the detection object T and the receiving array element 7 is 1.5 km in FIG. 8, the present invention is not limited to these values. Further, although the structure of the detection object T is enlarged in FIG. 8, the detection object T is made of iron and in a trapezoidal shape where the top side is 1 m and the bottom side is 3 m. The depth of the detection object T is in a range from 101 m to 103 m. As this example is based on the premise that the scanning sound wave 3a of 500 Hz is transmitted from the pseudo sound source 1, the wavelength of the scanning sound wave 3 is 3 m, so the detection object T can be the almost same size as the wavelength. It should be noted that the detection object T in FIG. 8 may be in a shape other than trapezoid.

Figure 13A:
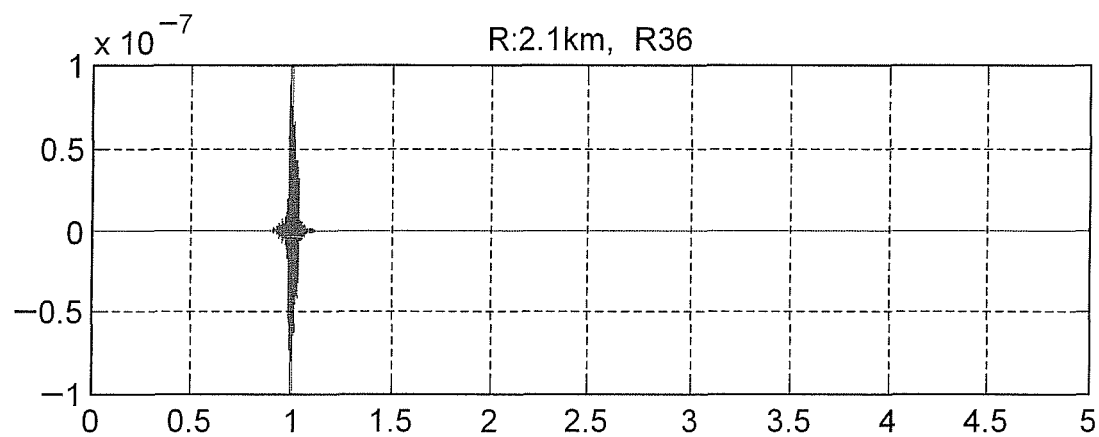
FIG. 13A illustrates a waveform of a sound wave which is transmitted from a transducer array and directly received by a reception array without any detection object.

According to the scattering theory, it is generally understood that the range capable of detecting an object is the wavelength or more. FIG. 13A shows a waveform in the case that the sea bottom is scanned according to the scanning sound wave 3 from the pseudo sound source 1 as described above in a state where the detection object T is not present in the sea bottom and the sound wave is received by one receiving array element 7a (5 m deep) of the receiving array element 7. In FIG. 13A, the horizontal axis indicates the propagation time of the scanning sound wave 3, and the vertical axis indicates the amplitude of the scan sound source 3. In FIG. 13A, a pulse of the sound wave appears at the position of one second of the propagation time. The pulse of the sound wave corresponds to the scanning sound wave 3 directly propagating from the pseudo sound source 1 toward the receiving array element 7. No other signal can be seen.

Figure 13B:
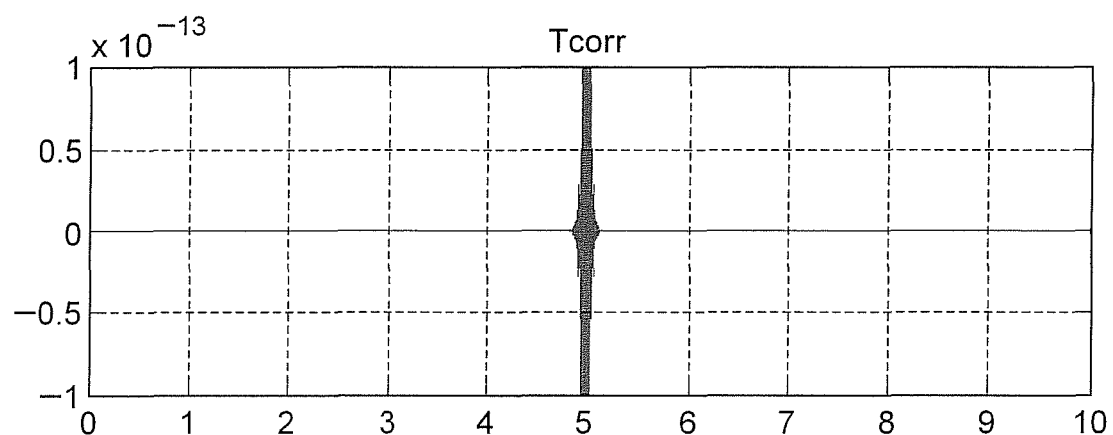
FIG. 13B illustrates a waveform of a signal which is correlated based on the received sound wave shown in FIG. 13A.

FIG. 13B shows a waveform of a sound wave processed by the passive phase conjugate processor 23 according to the equation (9). It is assumed that a signal received by the receiving array element 7a of the receiving array element 7 is $P_d$ in the equation (8). In this case, the reference signal and the data signal are assumed to be equal. The correlation processor 22 calculates the autocorrelation function between the reference signal and the data signal, and the passive phase conjugate processor 23 adds, that is, compresses, the autocorrelation value output from the correlation processor 22 according to the equation (9) for all receiving array elements 7a (passive phase conjugation). FIG. 13B shows the value processed by the passive phase conjugate processor 23. As obvious from the FIG. 13B, the form of the pulse is certainly corrected, and it is found that no other pulse appears.

Figure 14A:
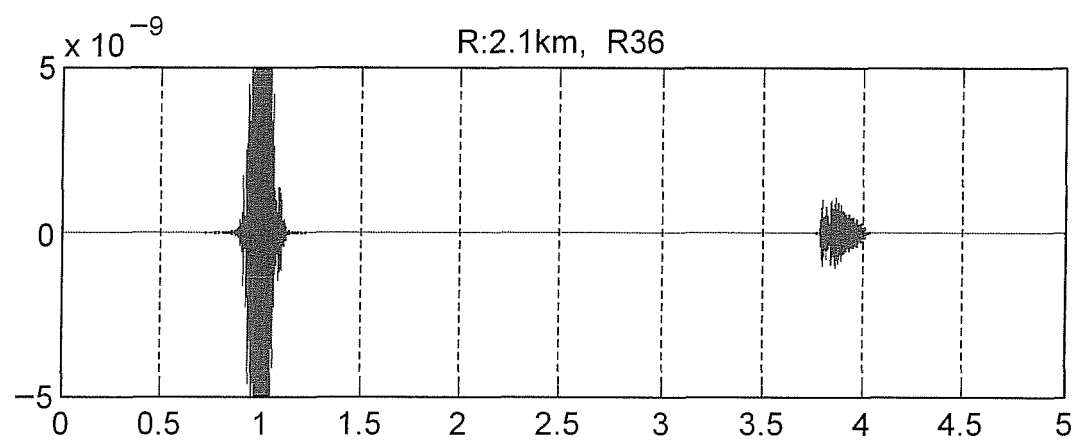
FIG. 14A illustrates a waveform of a sound wave which is reflected at a detection object and received.
Figure 14B:
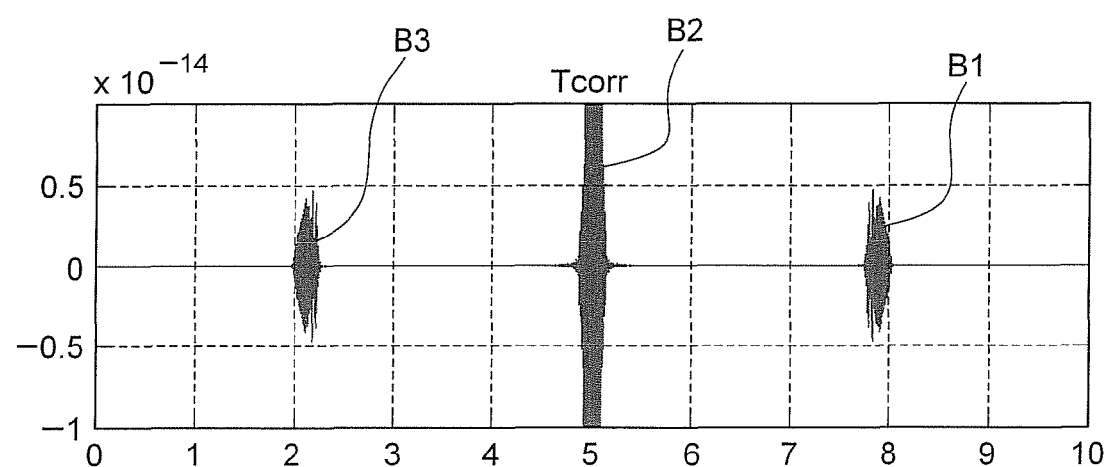
FIG. 14B illustrates a waveform of a signal which is correlated based on the sound wave reflected at a detection object.

Next, FIGS. 14A and 14B show signals received by the receiving array element 7 and signals on which passive phase conjugation has been performed, when the detection object T is buried in the submarine sediment. FIG. 14A shows a signal which is received by the receiving array element 7 of 5 m deep. In each of FIGS. 14A and 14B, a horizontal axis indicates the propagation time of the sound wave, and a vertical axis indicates the amplitude level of the sound wave.

In FIG. 14A, a sound pulse appearing at the position of one second of the propagation time is a scanning sound wave 3 directed directly from the pseudo sound source 1 to a receiving array element 7a of the receiving array element 7, as in FIG. 13A. In FIG. 14A, a signal appearing at the position of about 3.8 seconds is a reflected sound wave 6 which is reflected at the detection object T. A signal appearing at the position of about 3.8 seconds of the propagation time has small amplitude. This is because the propagation distance becomes longer, and the size of the detection object T is small, that is, the reflecting area of the scanning sound wave 3 is small.

FIG. 14B shows waveforms on which passive phase conjugation has been performed, as in FIG. 13B. In detecting the detection object T, since scanning is performed by cyclically transmitting pulses of the scanning sound wave 3 from the pseudo sound source 1, in the case of passive phase conjugation, a correlation waveform with the sound pulse of the previous cycle appears. A pulse of the correlation waveform is the first pulse B1. The next pulse is a sound pulse (scanning sound wave 3) B2 which is directly directed from the pseudo sound source 1 to the receiving array element 7, and the third pulse is a sound pulse (reflected sound wave 6) B3 reflected at the detection object T.

In comparison between FIGS. 13A and 13B and FIGS. 14A and 14B, there is obviously a difference between presence and absence of the detection object T. Accordingly, by displaying data output from the instruction unit 26 as image data D1, D2, and D3 shown in FIG. 12, the detection object T5 can be detected easily.

The controller 25 collectively controls the operation of the waveform analyzer 24, correlation processing by the correlation processor 22, and passive phase conjugation by the passive phase conjugate processor 23. The storing unit 27 provides information required for operation and the working domain required for computation of the controller 25, and the instruction unit 26 outputs data which is output through the controller 25 to the outside.

Next, the case of detecting the detection object T buried in the sea bottom using the detection device according to the exemplary embodiment will be described according to FIGS. 6 and 7.

As shown in FIG. 1, two survey vessels 8₁ and 8₂ are navigated in parallel while keeping a distance in the detecting sea area. Then, the transducer array 2 and the receiving array element 7, mounted in the survey vessels 8₁ and 8₂ respectively, are suspended to the water M from the survey vessels 8₁ and 8₂.

Next, environmental information for determining acoustic constant of the ocean in the detecting sea area is collected. As a series of operations for collecting the information, a calibration sound source is thrown or suspended to the detecting sea area where the detection object T is expected to be buried, and calibration signals transmitted from the calibration sound source are received by the receiving array element 2, and the analyzer 12 performs computation while changing the received signals and the predicted constant of the submarine sediment to thereby acquire data of the submarine sediment of the actual sea area.

Figure 6:
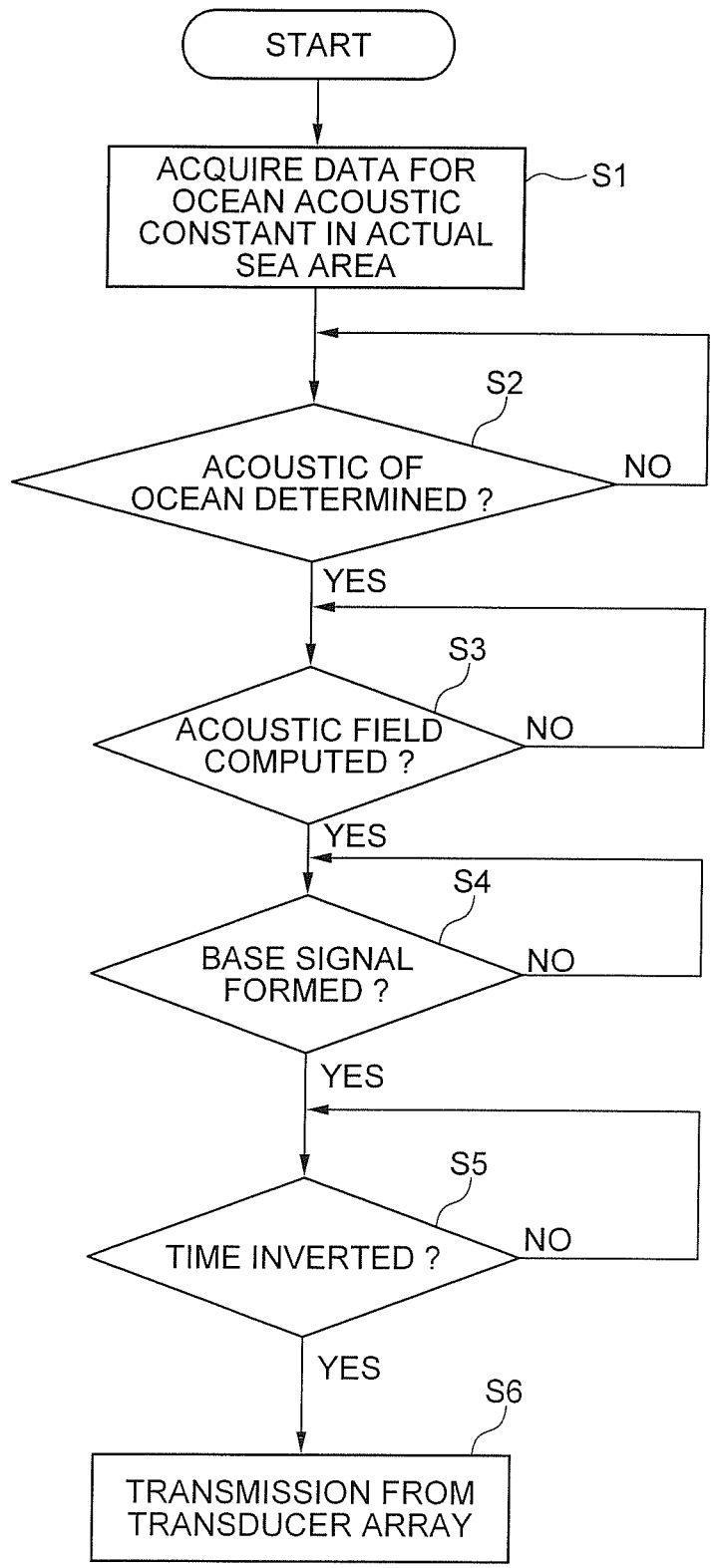
FIG. 6 is a flowchart showing active phase conjugation performed in the exemplary embodiment of the invention.

The analyzer 12 acquires the acoustic constants of the ocean relating to sound wave propagation in the environment of the detecting sea area, such as data of depth, sound speed of the sea water, and submarine sediments (sound speed, density), and acoustic constants of the ocean relating to the sound pulses in the environment, such as central frequency of sound pulses, data of spectrum of sound pulses and band width of sound pulses, depth data, and sound speed data (step S1 in FIG. 6).

When a sound wave from the calibration sound source, received by the transducer array 2, is input to the input unit 10, the input unit 10 removes unnecessary signal components included in the sound wave, A/D-converts the sound wave signal to a digital signal, and outputs the digital signal to the analyzer 12.

The analyzer 12 determines an acoustic constant of the ocean in the actual sea area based on the signal from the input unit 10 and on the input data for determining the ocean constant, and outputs the determined acoustic constant of the ocean in the actual sea area to the acoustic field calculator 14 (step S2 in FIG. 6, YES).

The acoustic field calculator 14 computes the sound pressure of the acoustic signal 1a which is assumed to be emitted from the pseudo sound source 1 and is received by each element 2a of the transducer array 2, which is the wave receiving point, according to the equation (2) to thereby calculate the acoustic field by the sound wave 1a (propagation calculation S1).

Then, the acoustic field calculator 14 calculates the variable $P(r, z, \omega)$ at any point $(r, z)$ within the acoustic field formed by the sound wave of angular frequency $\omega$ according to the equation (3), by using the sound wave propagation calculation model such as a coupled mode method.

As described above, the acoustic field calculator 14 calculates the distance r (r1, r2, r3 ... rn) from the pseudo sound source 1 to each of the elements 2a of the transducer array 2, calculates the mode function and the amplitude coefficient based on the acoustic constant of the ocean in the actual sea area determined by the analyzer 12, and based on the information, calculates the sound pressure at any arbitrary point within the acoustic field formed by the sound wave of the angular frequency $\omega$ according to the equation (3), assigning the equation (3) into the equation (2), and performing Fourier transform on the waveform of the pulse-state tone burst wave to thereby obtain the frequency spectrum $S(\omega)$ and assign $S(\omega)$ into the equation (2), and calculates the acoustic field by the acoustic signal 1a emitted from the pseudo sound source 1 according to the equation (2) (step S3 in FIG. 6, YES), to thereby form a base signal W1 such as P(r1, z1, t1~t2), P(r2, z2, t1~t2) ... P(rn-1, zn-1, t1~t2), P(rn, zn, t1~t2) as shown in FIG. 5 for each transmission wave element 2a (step S4 in FIG. 6, YES).

The acoustic field calculator 14 synchronizes base signals W1 having the pulse length of t1-t2, as shown in FIGS. 4 and 5, and output it to the conjugate signal generator 15 (step S4 in FIG. 6, YES).

As shown in FIGS. 4 and 5, the conjugate signal generator 15 performs time inversion on the base signal W1 formed by the acoustic field calculator 14 to thereby generate a phase-conjugate wave W2 in the time domain having a pulse length of t1'-t2' (step S5 in FIG. 6, YES).

As shown in FIGS. 4 and 5, the distribution synchronization output unit 16 distributes the phase-conjugate wave W2 from the conjugate signal generator 15 to each of the transducer array elements 2a of the transducer array 2, and in order to utilize the feature that the scanning sound wave 3 based on the time-inverted phase-conjugate wave W2 converges on the pseudo sound source 1 which is the generation source of the acoustic signal 1a, synchronizes the respective phase-conjugate waves W2 of P(r1, z1, t'1~t'2), P(r2, z2, t'1~t'2) P(rn-1, zn-1, T71~t'2) and P(rn, zn, t'1~t'2) and outputs them simultaneously from the respective transducer array elements 2a of the transducer array 2.

When the transducer array 2 receives the phase-conjugate wave W2 in the time domain from the distribution synchronization output unit 16, the transducer array 2 converts the phase-conjugate wave W2 which is an electric signal into an acoustic signal which propagates the underwater M, and transmits the scanning sound wave 3 from each of the transducer array elements 2a to the water M which is the propagation space. As the transducer array 2 is suspended from the survey vessel $8_1$, the scanning sound wave 3 is transmitted in a horizontal direction with respect to the water M, that is, in a direction toward the facing survey vessel $8_2$ (step S6 in FIG. 6).

Through the steps described above, the pseudo sound source 1 performs active phase processing on the acoustic signal 1a and transmits the generated scanning sound wave 3 to the sea M, and by utilizing the feature that the scanning sound wave 3 converges on the pseudo sound source 1 which is the generation source of the acoustic signal 1a, makes the scanning sound wave 3 converge on the detection object T in the water M.

As shown in FIGS. 1 and 5, the controller 19 repeatedly performs a series of operation for generating the sound wave W2 by the acoustic field calculator 14 and the conjugate signal generator 15 while sequentially moving the distance between the pseudo sound source 1 and the transducer array 2, that is, while sweeping the position of the pseudo sound source 1 at the sea bottom from the one survey vessel $8_1$ to the other survey vessel $8_2$ as shown in FIG. 5, whereby the controller 19 scans the sea bottom F with the sound wave 3 emitted from the transducer array 2.

Under the control of the controller 19, by repeatedly performing the wave generating operation while sweeping the position of the pseudo sound source 1 at the sea bottom from the one survey vessel $8_1$ to the other survey vessel $8_2$ as shown in FIG. 1, the scanning sound wave 3 transmitted from the transducer array 2 converges on the position of the original pseudo sound source 1 for each sweep. Therefore, with the position of the pseudo sound source 1 being moved along the bottom of the sea, the scanning sound wave 3 transmitted from the transducer array 2 scans the bottom of the sea while changing the converging position from the one survey vessel $8_1$ side to the other survey vessel $8_2$ side, as shown in FIGS. 15A to 15D.

Figure 15A:
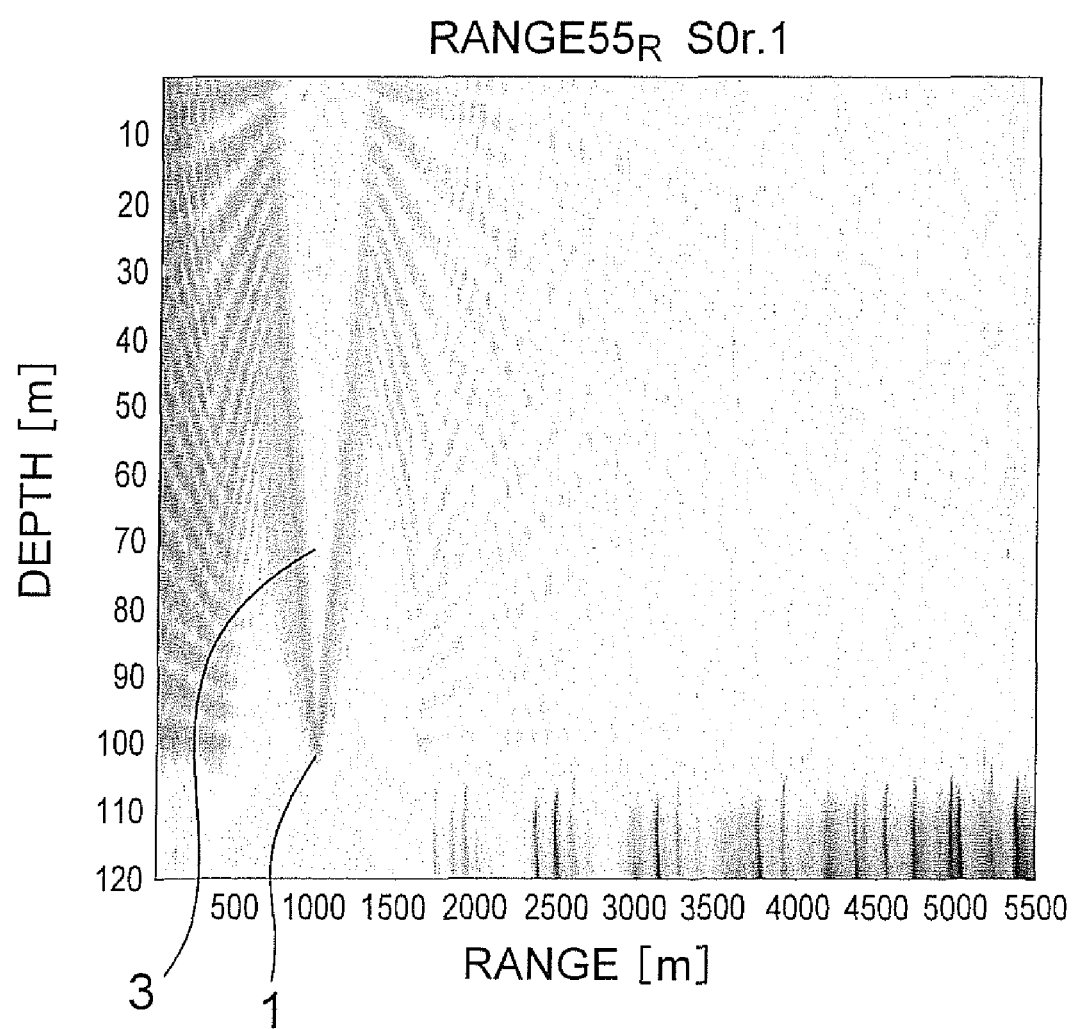
FIG. 15A illustrates that when the sea bottom is scanned with a scanning sound wave, a position, on which the scanning sound wave transmitted from a transducer array converges, changes.
Figure 15B:
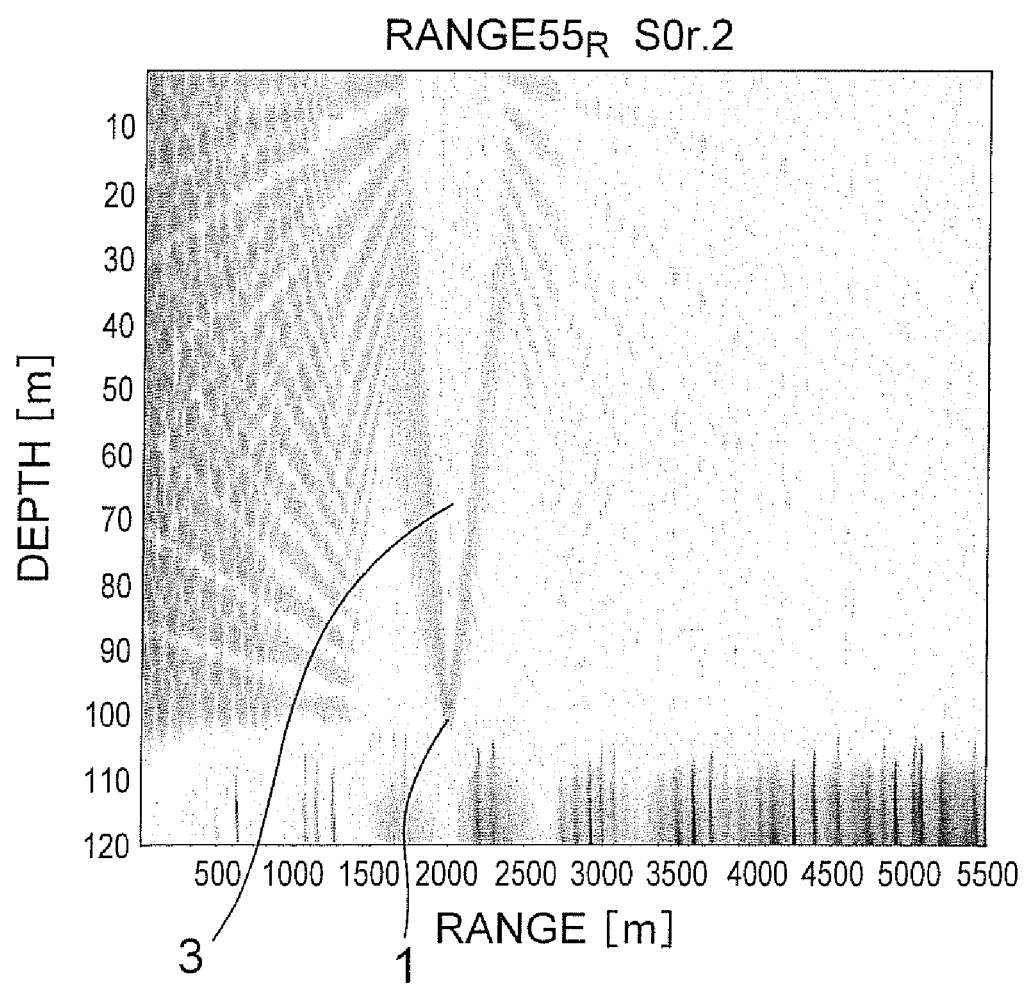
FIG. 15B illustrates that when the sea bottom is scanned with a scanning sound wave, a position, on which the scanning sound wave transmitted from a transducer array converges, changes.
Figure 15C:
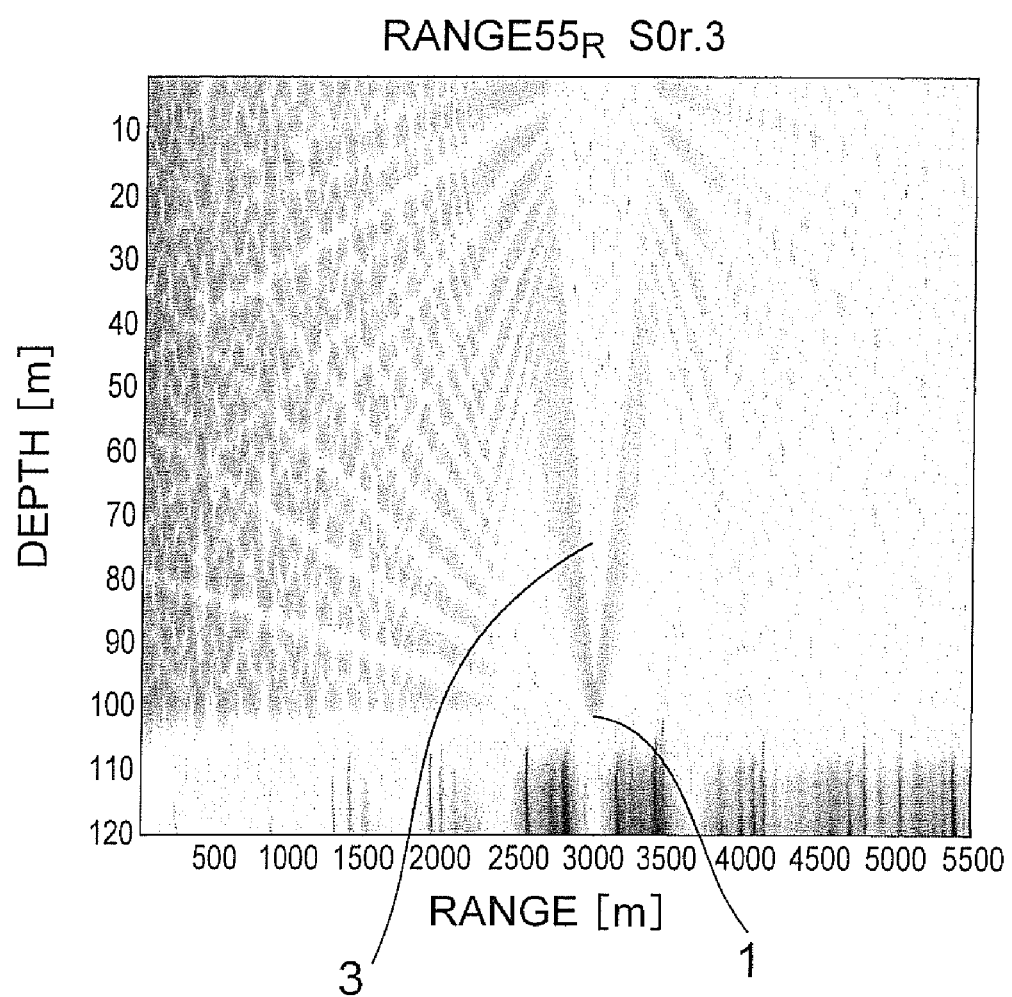
FIG. 15C illustrates that when the sea bottom is scanned with a scanning sound wave, a position, on which the scanning sound wave transmitted from a transducer array converges, changes.
Figure 15D:
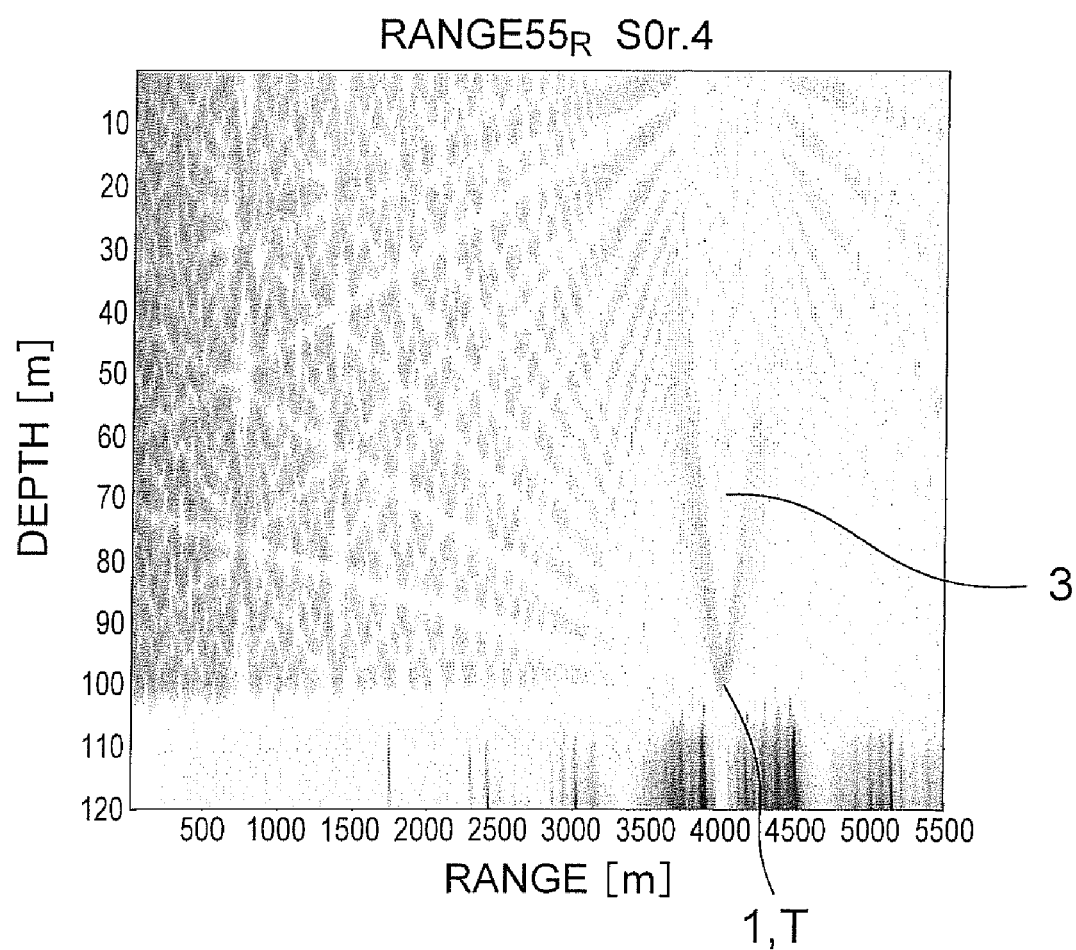
FIG. 15D illustrates that when the sea bottom is scanned with a scanning sound wave, a position, on which the scanning sound wave transmitted from a transducer array converges, changes.

The scanning sound wave 3 emitted from the position away from the immediately above the detection object T is made incident on the sea bottom from the above so as to be converged on a narrow range of the sea bottom, as shown in FIGS. 15A to 15D. Further, when the pseudo sound source 1 is moved along the sea bottom in a pseudo manner, the position where the scanning sound wave 3 converges moves in a moving direction of the pseudo sound source 1, that is, a direction from the one survey vessel $8_1$ to the other survey vessel $8_2$, as shown in FIGS. 15A and 15B.

There is also a case that a part of the scanning sound wave 3 transmitted from the transducer array 2 is repeatedly reflected between the sea surface P and the sea bottom F and propagates in the water M from the one survey vessel $8_1$ to the other survey vessel $8_2$ to thereby reach the receiving array element 7 directly.

As a part of the scanning sound wave 3 transmitted from the transducer array 2 scatters and propagates in the water M and converges on the position of the original position of the pseudo sound source 1, if the pseudo sound source 1 and the detection object T coincide with each other as the pseudo sound source 1 is swept as shown in FIG. 1, the sound wave 3 will be reflected at the detection object T and scatters in the water M as a reflected sound wave 6.

Figure 7:
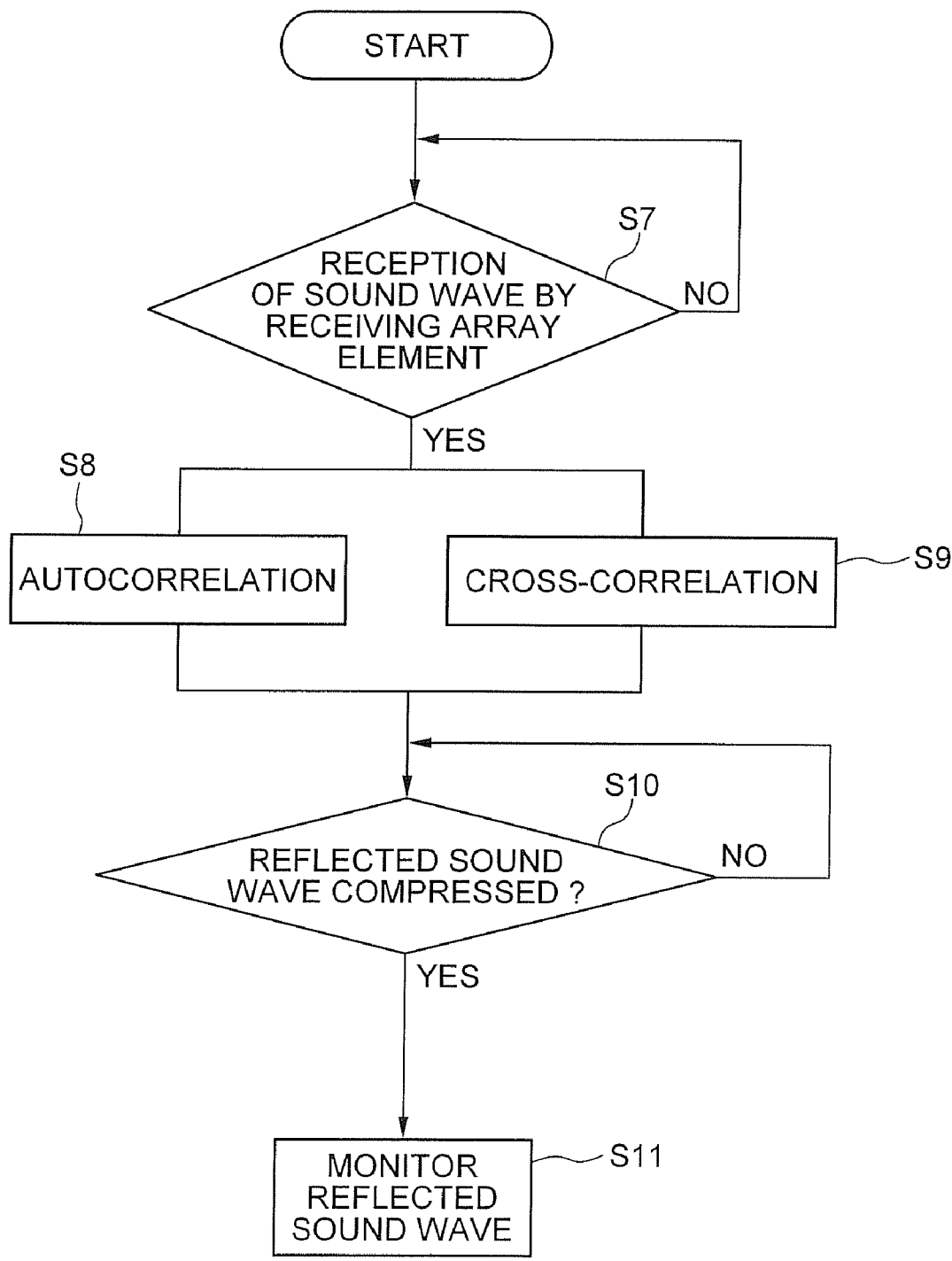
FIG. 7 is a flowchart showing passive phase conjugation performed in the exemplary embodiment of the invention.

As the sound wave 6 reflected at the detection object T propagates toward the receiving array element 7, the receiving array element 7 receives sound waves in the water M including the sound wave T, and converts the received sound waves into electric signals (detection signals) and outputs the electric signals to the time window/AD converter 21 (step S7 in FIG. 7, YES).

The time window/AD converter 22 removes unnecessary reflected waves and noises included in the signal output from each of the receiving array elements 7a of the receiving array element 7, and AD-converts the analog signal, from which the noises and the like have been removed, into a digital signal, and outputs the digital signal to the correlation processor 22.

The correlation processor 23 performs autocorrelation and cross-correlation using the base signals and the data signals (steps S8 and S9 in FIG. 7).

The passive phase conjugate processor 23 performs passive phase conjugation based on the correlation value output from the correlation processor 22, and reproduces the waveform of the reflected sound wave 6, which is reflected at the detection object T and propagates while scattering, to the waveform of the sound wave at the point that the sound wave is reflected at the detection object T (step S10 in FIG. 7).

By displaying the data to which passive phase conjugation is performed by the passive phase conjugate unit 23 on the instruction unit 26 as image data D1, D2 and D3, the detection object T is monitored and detected (step S11 in FIG. 8). The image data D1 shown in FIG. 12 indicates the case where no detection object T exists, and it is determined that the detection object T exists when the image data D2 and the image data D3 in FIG. 12 are shown.

According to the exemplary embodiment, by performing the phase conjugate pseudo sound source sweeping, an object can be detected without being constrained by the positional relationship between the object and the detecting position.

According to the exemplary embodiment, since the detection object is detected by emitting a sound wave from a position away from the immediately above the detection object so as to make the sound wave incident on the detection object from above, detection can be performed easily while securing the safety even if the detection object is explosive such as a mine.

In the above description, although presence or absence of the reflected sound wave 6 is detected by transmitting the scanning sound wave 3 in the water by the transducer array 2 from one survey vessel $8_1$ of the two facing vessels and the sound wave scattering and propagating in the water is received by the receiving array element 7, the present invention is not limited to this configuration. It is also acceptable that detection is performed in such a manner that both of the facing survey vessels $8_1$ and $8_2$ are provided with the pseudo sound sources 1, the transducer arrays 2, the receiving array elements 7, and the monitoring units 20, and scanning sound waves 3 by the pseudo sound sources 1 are alternately output from the both of the survey vessels $8_1$ and $8_2$.

Further, it is also acceptable to perform detection by mounting the pseudo sound source 1, the transducer array 2, the receiving array element 7 and the monitoring unit 20 in one survey vessel.

Although the case of applying the present invention to an example of detecting an object buried in the sea bottom has been described above, the present invention is not limited to this application. For instance, the present invention can be applied to the case of detecting an object in an environment which easily causes echoey effects and is dark such as a tunnel. In short, the present invention can be applied to any cases if it is possible to detect an object by performing active phase conjugation so as to make the sound wave converge on the detection object, and performing passive phase conjugation so as to compress the sound wave reflected at the detection object and complicatedly expanding (scattering) to thereby reproduce the scattered sound wave to the sound wave at the point of reflecting at the detection object.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

According to the present invention, it is possible to easily detect objects in a wide range.

What is claimed is:

1. A detection device which detects a detection object existing in an environment in which a sound wave for wave transmission scatters and propagates, comprising:
   a pseudo sound source; and
   a monitoring unit, wherein
   the pseudo sound source performs active phase conjugation so as to generate a scanning sound wave of a phase-conjugate wave in a time domain based on an acoustic signal, and by utilizing a feature that the scanning sound wave converges on the pseudo sound source which is a generation source of the acoustic signal, causes the scanning sound wave to converge on the detection object from above of the detection object in a propagation space, and
   the monitoring unit performs passive phase conjugation so as to extract a reflected sound wave which is reflected at the detection object from the sound wave in the propagation space.

2. The detection device, according to claim 1, wherein the pseudo sound source includes:
   an acoustic field calculator which computes an acoustic field at a point of receiving the acoustic signal, and forms a waveform of a base signal; and
   a conjugate signal generator which performs time inversion to a base signal formed by the acoustic field calculator to thereby generates a phase-conjugate wave in the time domain.

3. The detection device, according to claim 2, wherein
   the acoustic field calculator computes the acoustic field while taking into account an acoustic constant of the environment in which the sound wave scatters and propagates.

4. The detection device, according to claim 1, wherein a position of the pseudo sound source is moved in a pseudo manner in the propagation space.

5. The detection device, according to claim 1, wherein the pseudo sound source uses a pulse of a tone burst wave as the acoustic signal.

6. The detection device, according to claim 1, wherein the monitoring unit extracts the reflected sound wave by performing autocorrelation based on a sound wave which propagates in the propagation space and is received.

7. The detection device, according to claim 6, wherein the monitoring unit extracts the reflected sound wave by performing cross-correlation, in addition to the autocorrelation.

8. A program for detection which causes a computer, configuring a detection device which detects a detection object existing in an environment in which a sound wave for wave transmission scatters and propagates, to perform:
   a function of generating a scanning sound wave of a phase-conjugate wave in a time domain based on an acoustic signal by performing active phase conjugation; and
   a function of extracting a reflected sound wave reflected at the detection object from a sound wave in a propagation space by performing passive phase conjugation.

9. The program for detection, according to claim 8, which further causes the computer to perform:

a function of computing an acoustic field at a point of receiving the acoustic signal, and forming a waveform of a base signal; and a function of performing time inversion to the base signal formed by computation of the acoustic field, and generating a phase-conjugate wave in the time domain.

10. The program for detection, according to claim 9, which further causes the computer to perform a function of computing the acoustic field while taking into account an acoustic constant of the environment in which the sound wave scatters and propagates.

11. The program for detection, according to claim 8, which further causes the computer to perform a function of moving a position of a pseudo sound source generating the acoustic signal in the propagation space in a pseudo manner.

12. The program for detection, according to claim 8, which further causes the computer to perform a function of extracting the reflected sound wave by performing autocorrelation based on a sound wave which propagates in the propagation space and is received.

13. The program for detection, according to claim 12, which further causes the computer to perform a function of extracting the reflected sound wave by performing cross-correlation, in addition to the autocorrelation.

14. A method of detecting a detection object existing in an environment in which a sound wave for wave transmission scatters and propagates, comprising:

generating a scanning sound wave of a phase-conjugate wave in a time domain based on an acoustic signal by performing active phase conjugation, and causing the scanning sound wave to converge on the detection object from above of the detection object in a propagation space by utilizing a feature that the scanning sound wave converges on a pseudo sound source which is a generation source of the acoustic signal; and extracting a reflected sound wave which is reflected at the detection object from a sound wave within the propagation space by performing passive phase conjugation.

15. The method according to claim 14, further comprising:

computing an acoustic field at a point of receiving the acoustic signal, and forming a waveform of a base signal; and performing time inversion on the base signal, and generating a phase-conjugate wave in the time domain.

16. The method according to claim 15, wherein the acoustic field is computed while taking into account an acoustic constant of the environment in which the sound wave scatters and propagates.

17. The method according to claim 14, further comprising, moving a position of the pseudo sound source which generates the acoustic signal in the propagation space in a pseudo manner.

18. The method according to claim 14, wherein a pulse of a tone burst wave is used as the acoustic signal.

19. The method according to claim 14, wherein the reflected sound wave is extracted by performing autocorrelation based on a sound wave which propagates in the propagation space and is received.

20. The method according to claim 19, wherein the reflected sound wave is extracted by performing a cross-correlation, in addition to the autocorrelation.

* * * * *